United States Patent
Fujioka et al.

(10) Patent No.: US 12,269,225 B2
(45) Date of Patent: Apr. 8, 2025

(54) FIBER-REINFORCED RESIN SUBSTRATE, INTEGRATED MOLDED ARTICLE, AND METHOD FOR MANUFACTURING FIBER-REINFORCED RESIN SUBSTRATE

(71) Applicant: Toray Industries, Inc., Tokyo (JP)

(72) Inventors: Takashi Fujioka, Ehime (JP); Naokichi Imai, Ehime (JP); Masato Honma, Ehime (JP); Yoshiki Takebe, Ehime (JP); Kotaro Shinohara, Ehime (JP)

(73) Assignee: Toray Industries, Inc., Tokyo (JP)

( * ) Notice: Subject to any disclaimer, the term of this patent is extended or adjusted under 35 U.S.C. 154(b) by 742 days.

(21) Appl. No.: 17/604,489

(22) PCT Filed: May 15, 2020

(86) PCT No.: PCT/JP2020/019473
§ 371 (c)(1),
(2) Date: Oct. 18, 2021

(87) PCT Pub. No.: WO2020/235490
PCT Pub. Date: Nov. 26, 2020

(65) Prior Publication Data
US 2022/0212426 A1   Jul. 7, 2022

(30) Foreign Application Priority Data

May 23, 2019 (JP) .................. 2019-097038
May 23, 2019 (JP) .................. 2019-097039

(51) Int. Cl.
*B29C 70/88* (2006.01)
*B29C 70/20* (2006.01)
(Continued)

(52) U.S. Cl.
CPC .............. *B29C 70/88* (2013.01); *B29C 70/20* (2013.01); *B29K 2077/00* (2013.01);
(Continued)

(58) Field of Classification Search
CPC ..... B29C 70/16; B29C 70/88; B29C 70/0035; B29C 70/20; B29C 70/42; B29C 70/68;
(Continued)

(56) References Cited

U.S. PATENT DOCUMENTS

| 10,093,777 B2 | 10/2018 | Takebe et al. |
| 11,059,261 B2 | 7/2021 | Takebe et al. |

(Continued)

FOREIGN PATENT DOCUMENTS

| JP | 10138354 A | 5/1998 |
| JP | 2002316376 A | 10/2002 |

(Continued)

OTHER PUBLICATIONS

International Search Report and Written Opinion for International Application No. PCT/JP2020/019473, dated Aug. 11, 2020, 8 pages.

*Primary Examiner* — Camie S Thompson
(74) *Attorney, Agent, or Firm* — Buchanan Ingersoll & Rooney PC

(57) ABSTRACT

A fiber-reinforced plastic substrate is described in which a plurality of resins having different properties are firmly compounded and that includes components [A], [B], and [C]:
 [A] reinforcing fibers;
 [B] thermoplastic resin (b); and
 [C] thermoplastic resin (c),
wherein the component [A] is arranged in one direction, in the fiber-reinforced plastic substrate, a resin area including the component [B] and a resin area including the component [C] are present, the resin area including the component [B] is present on a surface of one side of the fiber-reinforced plastic substrate, and a distance $Ra_{(bc)}$ between Hansen solubility parameters of the component [B] and the component [C] satisfies formula (1):

(Continued)

$$Ra_{(bc)}=\{4(\delta DB-\delta DC)^2+(\delta PB-\delta PC)^2+(\delta HB-\delta HC)^2\}^{1/2} \geq 8$$

wherein $Ra_{(bc)}$, δDB, δDC, δPB, δPC, δHB and δHC are as defined.

21 Claims, 7 Drawing Sheets

(51) Int. Cl.
  *B29K 77/00* (2006.01)
  *B29K 81/00* (2006.01)
  *B29K 105/08* (2006.01)
  *B29K 105/10* (2006.01)
  *B29K 307/04* (2006.01)

(52) U.S. Cl.
  CPC .. *B29K 2081/06* (2013.01); *B29K 2105/0845* (2013.01); *B29K 2105/105* (2013.01); *B29K 2307/04* (2013.01); *B29K 2995/0059* (2013.01); *B29K 2995/0072* (2013.01)

(58) Field of Classification Search
  CPC ... C08J 5/042; C08J 5/243; C08J 5/244; C08J 5/04; C08J 5/043; C08J 2323/12; C08J 2371/00; C08J 2381/04; C08J 2463/00; C08J 2471/00; C08J 2477/02; C08J 2481/04; B29K 2077/00; B29K 2081/06; B29K 2105/08; B29K 2105/0845; B29K 2105/105; B29K 2307/04; B29K 2307/72; B29K 2307/718; B29K 2307/54; B29K 2307/732; B29K 2995/0059; B29K 2995/0072; B32B 5/024; B32B 7/02; B32B 27/00; B32B 27/12; B32B 27/32; B32B 27/34; B32B 27/36; B32B 27/38; B32B 2260/021; B32B 2260/046; B32B 2262/0261; B32B 2262/0269; B32B 2262/101; B32B 2262/103; B32B 2262/105; B32B 2262/106; B32B 2605/00; B32B 2605/10; B32B 2605/12; B32B 2605/18
  USPC .................. 428/221, 297.1, 292.1, 297.4
  See application file for complete search history.

(56) References Cited

U.S. PATENT DOCUMENTS

| | | |
|---|---|---|
| 2014/0154472 A1 | 6/2014 | Eto et al. |
| 2018/0282500 A1 | 10/2018 | Hosoda et al. |
| 2019/0291398 A1 | 9/2019 | Miyake |

FOREIGN PATENT DOCUMENTS

| | | |
|---|---|---|
| JP | 2006205436 A | 8/2006 |
| JP | 2012246442 A | 12/2012 |
| JP | 2013209626 A | 10/2013 |
| JP | 2016196142 A | 11/2016 |
| WO | 2013008720 A1 | 1/2013 |
| WO | 2013128841 A1 | 9/2013 |
| WO | 2014103658 A1 | 7/2014 |
| WO | 2014162873 A1 | 10/2014 |
| WO | 2017122740 A1 | 7/2017 |
| WO | 2018043360 A1 | 3/2018 |

(a)  (b)  (c)

(a)  (b)  (c)

FIBER-REINFORCED RESIN SUBSTRATE, INTEGRATED MOLDED ARTICLE, AND METHOD FOR MANUFACTURING FIBER-REINFORCED RESIN SUBSTRATE

CROSS REFERENCE TO RELATED APPLICATIONS

This is the U.S. National Phase application of PCT/JP2020/019473, filed May 15, 2020, which claims priority to Japanese Patent Application No. 2019-097038, filed May 23, 2019 and Japanese Patent Application No. 2019-097039, filed May 23, 2019, the disclosures of these applications being incorporated herein by reference in their entireties for all purposes.

FIELD OF THE INVENTION

The present invention relates to a fiber-reinforced plastic substrate obtained by impregnating reinforcing fibers with at least two thermoplastic resins, an integrated molded article, and a method for producing a fiber-reinforced plastic substrate.

The present invention also relates to a fiber-reinforced plastic substrate excellent in productivity of an integrated molded article and an integrated molded article using the fiber-reinforced plastic substrate.

BACKGROUND OF THE INVENTION

Fiber-reinforced composite materials obtained by using a thermosetting resin or a thermosetting resin as a matrix and combining the matrix with reinforcing fibers such as carbon fibers and glass fibers are lightweight and excellent in mechanical properties such as strength and rigidity, and therefore are applied to many fields such as aerospace, automobiles, railway vehicles, ships, civil engineering and construction, and sporting goods. However, these fiber-reinforced composite materials are not suitable for manufacturing parts and structures having complicated shapes in a single molding step, and in such applications, a step of producing a member made of a fiber-reinforced composite material and then integrating the member with another member is required. At this time, resins having different properties may be combined as necessary. As a method for integrating a fiber-reinforced composite material and another member, a joining method using mechanical joining such as a bolt, a rivet, or a screw, or a joining method using an adhesive is used. In the mechanical joining method, because a step of processing a joining portion in advance such as drilling is required, there is a problem that the manufacturing process is prolonged and the manufacturing cost increases, and because a hole is made, the material strength decreases. In the joining method using an adhesive, an adhesion step and a curing step including preparation of an adhesive and application work of an adhesive are required, and thus there is a problem that the manufacturing step is prolonged and sufficient reliability is not satisfied even in terms of adhesive strength. In addition, there is a method of obtaining molded articles made of different types of thermoplastic resins such as two-color molding, but in the case of a combination of resins having low compatibility, integration by shape design such as fitting is the mainstream, and there is also a problem that the degree of freedom in design is low.

Here, Patent Document 1 discloses a prepreg sheet material in which a plurality of resin areas made of different thermoplastic resins are formed in a reinforcing fiber sheet layer aligned in a predetermined direction. Patent Document 2 discloses a fiber-reinforced plastic sheet in which a nonwoven fabric formed of reinforcing fibers is impregnated with a plurality of different thermoplastic resins. Patent Document 3 discloses a thermoplastic resin prepreg including a thermoplastic resin having a difference in melting point from a material constituting reinforcing fibers.

Because a method of joining members by welding can be applied to a fiber-reinforced composite material using a thermoplastic resin as a matrix, there is a possibility that the time required for joining members can be shortened. On the other hand, in recent years, shapes required for products have become complicated, and it has become necessary to integrate various members according to required properties. In the production of such a molding, productivity improvement and product yield improvement, that is, a technique of reducing a disposal rate has been required.

Regarding a technique for joining members by welding, Patent Document 4 discloses a fiber-reinforced composite material plate including reinforcing fibers and a matrix resin having a crosslinked structure and having a thermoplastic resin on the surface. Patent Document 2 discloses a fiber-reinforced plastic sheet in which a nonwoven fabric formed of reinforcing fibers is impregnated with two types of thermoplastic resins. Patent Document 5 discloses a sandwich laminated body in which a sheet-like intermediate substrate obtained by impregnating a mat made of reinforcing fibers with a thermoplastic resin is used for a skin forming layer and a core forming layer.

PATENT DOCUMENTS

Patent Document 1: Japanese Patent Laid-open Publication No. 2012-246442
Patent Document 2: WO 2014/103658
Patent Document 3: WO 2013/8720
Patent Document 4: Japanese Patent Laid-open Publication No. 2006-205436
Patent Document 5: WO 2014/162873

SUMMARY OF THE INVENTION

However, in the prepreg sheet material shown in Patent Document 1, the boundary portion between the resin areas is in a state of entering the inside of the reinforcing fiber sheet layer, but this state is not mentioned, and the joining state of the different resins is not sufficient. The fiber-reinforced plastic sheet shown in Patent Document 2 is defined for the irregularity shape of the interface layer formed of two types of thermoplastic resins, and there is a high possibility that the fiber-reinforced resin sheet has sufficient joining strength. However, because a nonwoven fabric made of reinforcing fibers is used, the fiber-reinforced resin sheet does not have sufficient joining strength stability (small variation). The thermoplastic resin prepreg shown in Patent Document 3 is a combination of substantially the same type of thermoplastic resins (the same type except for the molecular structure), and cannot satisfy the purpose of obtaining a composite material made of a combination of resins having different required properties.

In addition, in the approach of the composite materials described in these documents, different resins are simultaneously melted at a specific temperature to impregnate reinforcing fibers with the resins, and thus, there are cases where the combination of resins is limited or where one of the resins deteriorates due to thermal decomposition or the like and it becomes difficult to obtain a fiber-reinforced composite material in a sound state.

Therefore, a first object of the present invention is to provide a fiber-reinforced plastic substrate in which a plurality of resins having different properties are firmly compounded.

In addition, in Patent Document 4, a first thermoplastic resin is disposed on a surface of a fiber-reinforced composite material plate, and a second thermoplastic resin different from the first thermoplastic resin is disposed in an overlapping manner on an outer surface of the first thermoplastic resin, and thus the lamination order is different from that of the present invention. Furthermore, it is mentioned that it is preferable to achieve both adhesiveness and heat resistance by using two types of thermoplastic resins having close solubility parameters in an overlapping manner for the adhesive layer, and it has been insufficient from the viewpoint of the degree of freedom in designing an adhesive surface for bonding another member in integral molding with complicated and diverse parts.

In the method described in Patent Document 2, because the fiber-reinforced resin sheet is a fiber-reinforced resin sheet in which a nonwoven fabric formed of reinforcing fibers is impregnated with a thermoplastic resin, when the fiber-reinforced resin sheet is used for welding, the thermoplastic resin melts, and in some cases the orientation of the reinforcing fibers is disturbed to deteriorate mechanical properties of the resulting molded article and deform the molded article into an unintended shape.

In the method described in Patent Document 5, because the same type of thermoplastic resins is used for the skin layers, that is, both surfaces, when another member (resin member) is welded, the resin member may be welded to an unintended portion of the substrate, and the degree of freedom in designing the bonding surface is insufficient.

Therefore, a second object of the present invention is to provide a fiber-reinforced plastic substrate that can be joined to another member by welding, exhibits excellent joining strength, and can be easily welded even when a plurality of another members having different welding properties are used, and thus has a high degree of freedom in design for joining, and an integrated molded article using the fiber-reinforced plastic substrate.

To solve such a problem, a fiber-reinforced plastic substrate according to a first aspect of the present invention has the following configuration. That is, a fiber-reinforced plastic substrate including components [A], [B], and [C] shown below:
[A] reinforcing fibers;
[B] thermoplastic resin (b); and
[C] thermoplastic resin (c),
wherein
the component [A] is arranged in one direction,
in the fiber-reinforced plastic substrate, a resin area including the component [B] and a resin area including the component [C] are present,
the resin area including the component [B] is present on a surface of one side of the fiber-reinforced plastic substrate,
a distance $Ra_{(bc)}$ between Hansen solubility parameters of the component [B] and the component [C] satisfies formula (1):

$$Ra_{(bc)} = \{4(\delta DB - \delta DC)^2 + (\delta PB - \delta PC)^2 + (\delta HB - \delta HC)^2\}^{1/2} \geq 8 \quad \text{Formula (1)}$$

wherein
$Ra_{(bc)}$ is a distance between Hansen solubility parameters of the component [B] and the component [C];
$\delta DB$ is an energy due to intermolecular dispersive power of the component [B];
$\delta DC$ is an energy due to intermolecular dispersive power of the component [C];
$\delta PB$ is an energy due to intermolecular dipole interaction of the component [B];
$\delta PC$ is an energy due to intermolecular dipole interaction of the component [C];
$\delta HB$ is an energy due to intermolecular hydrogen bonding of the component [B]; and
$\delta HC$ is an energy due to intermolecular hydrogen bonding of the component [C], and
the component [A] is present across a boundary between the resin area including the component [B] and the resin area including the component [C] and included in both resin areas.

The present invention also includes an integrated molded article obtained by joining another member to the fiber-reinforced plastic substrate.

To solve such a problem, a fiber-reinforced plastic substrate according to a second aspect of the present invention has the following configuration. That is, a fiber-reinforced plastic substrate including components [A], [B'], [C'], and [D] shown below:
[A] reinforcing fibers;
[B'] thermoplastic resin (b');
[C'] thermoplastic resin (c'); and
[D] thermosetting resin (d),
wherein
a resin area (B') including the component [B'], a fiber-reinforced plastic area (E) including the component [D] and the component [A], and a resin area (C') including the component [C'] are adjacent in this order to form boundaries, and
the component [B'] and the component [C'] satisfy formula (3):

$$2 < \Delta SP \leq 10 \quad \text{Formula (3)}$$

wherein
$\Delta SP$ is an absolute value of difference between SPa and SPc;
SPa is an SP value of the component [B'] [$(MPa)^{1/2}$]; and
SPc is an SP value of the component [C'] [$(MPa)^{1/2}$].

The present invention also includes an integrated molded article in which a resin part (F) is integrated with the above-described fiber-reinforced plastic substrate by being joined to a surface of the resin area (B') and/or a resin part (G) is integrated with the fiber-reinforced plastic substrate by being joined to a surface of the resin area (C'),
wherein a proportion of a joining area between the resin area (B') and the resin part (F) is in a range of 5% or more and less than 50% when a surface area of the resin area (B') is 100%, and/or a proportion of a joining area between the resin area (C') and the resin part (G) is in a range of 5% or more and less than 50% when a surface area of the resin area (C') is 100%.

Furthermore, a method for producing a fiber-reinforced plastic substrate of the present invention has the following configuration. That is, a method for producing a fiber-reinforced plastic substrate including components [A], [B], and [C] shown below:
[A] reinforcing fibers;
[B] thermoplastic resin (b); and
[C] thermoplastic resin (c), wherein
at least a drawing step, a first impregnating step, and a second impregnating step shown below are carried out continuously in this order while causing the component [A] to travel:

<drawing step> a step of obtaining a continuous reinforcing fiber sheet in which the component [A] is arranged in one direction by aligning the continuous component [A], and then supplying the obtained continuous reinforcing fiber sheet including the component [A] in a fiber direction toward a subsequent step;

<first impregnating step> a step of impregnating the component [B] from one surface of the continuous reinforcing fiber sheet to obtain a fiber-reinforced plastic intermediate in which the component [B] is present on a first surface of the continuous reinforcing fiber sheet;

<second impregnating step> a step of impregnating component [C] from a second surface opposite to the first surface to obtain a fiber-reinforced plastic substrate, and a distance $Ra_{(bc)}$ between Hansen solubility parameters of the component [B] and the component [C] satisfies formula (5):

$$Ra_{(bc)} = \{4(\delta DB - \delta DC)^2 + (\delta PB - \delta PC)^2 + (\delta HB - \delta HC)^2\}^{1/2} \geq 8 \quad \text{Formula (5)}$$

wherein $Ra_{(bc)}$ is a distance between Hansen solubility parameters of the component [B] and the component [C];

$\delta DB$ is an energy due to intermolecular dispersive power of the component [B];

$\delta DC$ is an energy due to intermolecular dispersive power of the component [C];

$\delta PB$ is an energy due to intermolecular dipole interaction of the component [B];

$\delta PC$ is an energy due to intermolecular dipole interaction of the component [C];

$\delta HB$ is an energy due to intermolecular hydrogen bonding of the component [B]; and $\delta HC$ is an energy due to intermolecular hydrogen bonding of the component [C].

Because the fiber-reinforced plastic substrate according to the first aspect of the present invention is a composite of resins of a combination of different properties, particularly a plurality of thermoplastic resins having low compatibility with each other, it is possible to obtain a substrate having a combination of different properties, which was difficult in conventional techniques. In addition, by using the fiber-reinforced plastic substrate of the present invention, it is possible to provide an integrated molded article in which a plurality of members are firmly integrated, which has been difficult to obtain by conventional techniques. Furthermore, by using the method for producing a fiber-reinforced plastic substrate of the present invention, it is possible to produce a fiber-reinforced plastic substrate by compositing resins without causing deterioration such as thermal decomposition, even with a combination of resins which were difficult to be compounded in conventional techniques.

In addition, because the fiber-reinforced plastic substrate according to the second aspect of the present invention can be welded to another member, the time required for the joining step can be reduced and the molding speed of the structural member can be increased as compared with a conventional fiber-reinforced composite material made of a thermosetting resin and a reinforcing fiber. Furthermore, because the fiber-reinforced plastic substrate can be molded with high productivity even when a plurality of another members having different welding properties are used, it is possible to greatly reduce the molding time and the molding cost of the product while having excellent performance as a structure by applying it to aircraft structural members, wind turbine blades, automobile structural members, and computer applications such as IC trays and housing of notebook computers.

DETAILED DESCRIPTION OF EMBODIMENTS OF THE INVENTION

Figure 1:
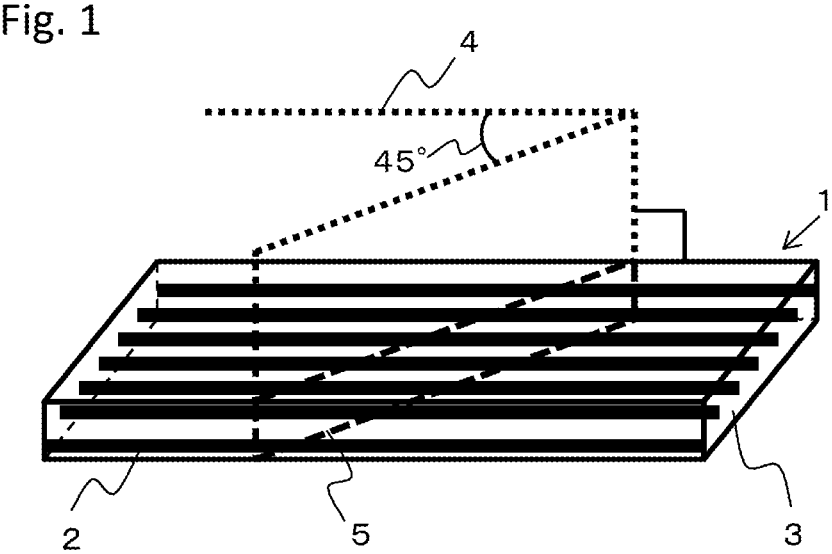
FIG. 1 is a schematic view of a fiber-reinforced plastic substrate according to a first aspect of the present invention.

Hereinafter, a fiber-reinforced plastic substrate according to the first and second aspects of the present invention will be described.

[First Aspect]

The fiber-reinforced plastic substrate according to the first aspect of the present invention includes at least the following components [A], [B], and [C].

(Component [A])

Examples of the reinforcing fibers of the component [A] used in the present invention include glass fibers, carbon fibers, metal fibers, aromatic polyamide fibers, polyaramid fibers, alumina fibers, silicon carbide fibers, boron fibers, and basalt fibers. They may be used singly or in combination of two or more kinds thereof. These reinforcing fibers may be subjected to surface treatment. Examples of the surface treatment include a metal application treatment, a treatment with a coupling agent, a treatment with a sizing agent, and an additive adhesion treatment. In these reinforcing fibers, reinforcing fibers having conductivity are also included.

As the reinforcing fibers, carbon fibers having a small specific gravity, high strength, and high elastic modulus are preferably used. Examples of commercially available products of carbon fibers include "TORAYCA®" T800G-24K, "TORAYCA®" T800S-24K, "TORAYCA®" T700G-24K, "TORAYCA®" T700S-24K, "TORAYCA®" T300-3K, and "TORAYCA®" T1100G-24K (all manufactured by Toray Industries, Inc.).

In the component [A], the reinforcing fibers are arranged in one direction. The component [A] may be a layered product obtained by laminating a plurality of layers of reinforcing fibers arranged in one direction. In this case, the reinforcing fibers may be arranged in one direction in each layer, and the reinforcing fibers included in different layers may be directed in different directions. Using reinforcing fibers arranged in one direction is preferable because a molding that is lightweight, high in durability, and small in deformation in the welding step can be obtained.

By forming the component [A] in such a form or arrangement, a cross-section curve formed by the boundary between the resin area including the component [B] and the resin area including the component [C] can be easily formed in such a manner to satisfy preferable structural requirements described later, and can be formed uniformly. As a result, the reinforcing fibers can be present across the boundary between the resin area including the component [B] and the resin area including the component [C]. It is also possible to reduce variations in joining strength when the fiber-reinforced plastic substrate and another member are integrated.

These forms may be obtained by aligning a plurality of reinforcing fiber bundles formed of reinforcing fibers and arranging them in one direction as described later. The reinforcing fiber bundle may be formed of a plurality of fibers of the same form, or may be formed of a plurality of fibers of different forms. The number of reinforcing fibers constituting one reinforcing fiber bundle is usually 300 to 60,000, and is preferably 300 to 48,000, and more preferably 1,000 to 24,000 in consideration of production of a substrate. The range may be a combination of any of the upper limits and any of the lower limits shown above.

The tensile strand strength of the reinforcing fibers of the component [A] is preferably 5.5 GPa or more as measured in accordance with the resin-impregnated strand test method of JIS-R7608(2004) because a fiber-reinforced plastic substrate having excellent joining strength in addition to tensile strength can be obtained.

The content rate of the component [A] in the fiber-reinforced plastic substrate of the present invention is preferably 30 to 90 mass %, more preferably 35 to 85 mass %, and further preferably 40 to 80 mass %. The range may be a combination of any of the upper limits and any of the lower limits shown above. When the content rate of the component [A] is 30 mass % or more, the reinforcing fibers of the component [A] are present to form a structure (anchoring structure) present across the boundary between the resin area including the component [B] and the resin area including the component [C], and the resin area including the component [B] and the resin area including the component [C] can be brought into a strong joining state. When the content rate of the component [A] is 90 mass % or less, impregnation failure of the thermoplastic resin is unlikely to occur, and voids in the resulting fiber-reinforced plastic substrate are likely to decrease.

[Impregnation Rate]

The fiber-reinforced plastic substrate of the present invention preferably has an impregnation rate of 80% or more. The impregnation rate is more preferably 85% or more, and further preferably 90% or more. Here, the impregnation rate is a ratio of how much the component [A] is impregnated with a resin selected from the component [B] and the component [C]. The larger the impregnation rate is, the smaller the number of voids contained in the fiber-reinforced plastic substrate is, and a fiber-reinforced plastic substrate having good appearance and high mechanical properties can be obtained. As a method for measuring the impregnation rate, the impregnation rate can be determined by measuring the ratio of the portion not impregnated with the resin (referred to as a void portion) rather than the ratio of how much the fiber-reinforced plastic substrate is impregnated with the resin. In observation of a cross section orthogonal to the longitudinal direction of the obtained fiber-reinforced plastic substrate, the impregnation rate is determined by the following formula (6) when the total cross-sectional area of the fiber-reinforced plastic substrate is defined as A0 and the cross-sectional area of voids in the fiber-reinforced plastic substrate is defined as A1.

$$\text{Impregnation rate}=(A0-A1)/A0 \qquad (6).$$

The fiber-reinforced plastic substrate of the present invention preferably has a mass of the component [A] per unit area of 30 to 2,000 $g/m^2$. When the mass of the component [A] per unit area is 30 $g/m^2$ or more, the number of layers for obtaining a predetermined thickness in molding the fiber-reinforced plastic laminated body can decrease, and the operation is likely to be simple. When the mass of the component [A] per unit area is 2,000 $g/m^2$ or less, the drapability of the fiber-reinforced plastic substrate is likely to improve. The mass of the component [A] per unit area is preferably 300 $g/m^2$ or less. By having the mass of the component [A] within such a range, the component [B] in the first impregnating step and the component [C] in the second impregnating step described later are easily impregnated, and the manufacturing speed can increase.

(Component [B], Component [C])

The thermoplastic resin (b) constituting the component [B] and the thermoplastic resin (c) constituting the component [C] are not limited to particular resin as long as they are a combination that satisfies the relationship of the distance $Ra_{(bc)}$ between Hansen solubility parameters described later. Examples of the thermoplastic resin (b) and the thermoplastic resin (c) include polyester-based resin such as polyethylene terephthalate, polybutylene terephthalate, polytrimethylene terephthalate, polyethylene naphthalate, or liquid crystal polyester; polyolefin such as polyethylene, polypropylene, or polybutylene; styrene-based resin; urethane resin; polyamide-based resin such as aliphatic polyamide for example polyoxymethylene, polyamide 6, or polyamide 66, semi-aromatic polyamide, or alicyclic polyamide; polycarbonate; polymethyl methacrylate; polyvinyl chloride; polyarylene sulfide such as polyphenylene sulfide; polyphenylene ether; modified polyphenylene ether; polyimide; polyamideimide; polyetherimide; polysulfone; modified polysulfone; polyethersulfone; polyarylene ether ketone such as polyketone, polyether ketone, polyether ether ketone, or polyether ketone ketone; polyarylate; polyether nitrile; phenol-based resin; and phenoxy resin. These thermoplastic resins may be copolymers or modified products of the above-mentioned resins, and/or resins obtained by blending two or more kinds thereof. A crystalline thermoplastic resin having a glass transition temperature of 80° C. or more or an amorphous thermoplastic resin having a glass transition temperature of 160° C. or more is preferable from the viewpoint of good heat resistance and being difficult to have thermal deformation.

Among them, the thermoplastic resin (b) and the thermoplastic resin (c) are preferably at least one thermoplastic resin selected from the group consisting of polyolefin, polycarbonate, polyester, polyarylene sulfide, polyamide, polyoxymethylene, polyetherimide, polyethersulfone, and polyarylene ether ketone from the viewpoint of the balance between molding processability and heat resistance or mechanical properties.

Furthermore, the thermoplastic resin (b) and the thermoplastic resin (c) may appropriately contain another filler or additive within a range not impairing the object of the present invention depending on the use and the like. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

In the fiber-reinforced plastic substrate of the present invention, the basis weight of the component [B] and the component [C] is preferably 10 $g/m^2$ or more. When the basis weight is 10 $g/m^2$ or more, in welding and joining with another member described later, a welding and joining area having a sufficient thickness is obtained, and excellent joining strength is exhibited. The basis weight is more preferably 20 $g/m^2$ or more. Here, the basis weight refers to the mass (g) of the component [B] or the component [C] included per 1 $m^2$ of the fiber-reinforced plastic substrate.

The content rates of the component [B] and the component [C] in the fiber-reinforced plastic substrate of the present invention are each preferably 10 to 50 mass %, and more preferably 20 to 40 mass %. The range may be a combination of any of the upper limits and any of the lower limits shown above. When the content rates of the component [B] and the component [C] are each 10 mass % or more, insufficient impregnation of the component [B] and component [C] is unlikely to occur, and voids in the resulting fiber-reinforced substrate are likely to decrease. In addition, it is possible to firmly compound the component [B] and the component [C]. When the content rates of the component [B] and the component [C] are each 50 mass % or less, it becomes easy for the component [A] to be present forming an anchoring structure in the thermoplastic resin of the component [B] and the component [C], and thus the thermoplastic resin of the component [A] and the thermoplastic resin of the component [C] can be strongly compounded.

Furthermore, the fiber-reinforced plastic substrate of the present invention preferably satisfies the following formula (2) in the relationship between the thermoplastic resin (b) and the thermoplastic resin (c).

$$50 \leq \Delta T \leq 200 \quad \text{Formula (2)}$$

ΔT: absolute value of difference between Tb and Tc

Tb: melting point of the thermoplastic resin (b) when the thermoplastic resin (b) is a crystalline resin, and glass transition temperature [° C.] of the thermoplastic resin (b) when the thermoplastic resin (b) is an amorphous resin Tc: melting point of the thermoplastic resin (c) when the thermoplastic resin (c) is a crystalline resin, and glass transition temperature [° C.] of the thermoplastic resin (c) when the thermoplastic resin (c) is an amorphous resin In the present specification, the Tb and Tc are both referred to as a melting temperature. When the fiber-reinforced plastic substrate of the present invention is joined to another member made of a thermoplastic resin, it is preferable to perform joining by welding because the thermoplastic resins are mixed in a molten state to improve the joining strength with another member. In the fiber-reinforced plastic substrate of the present invention, when each of the thermoplastic resin (b) and the thermoplastic resin (c) is welded to another member, it is preferable to increase the difference between the processing temperature in the step of welding another member to the thermoplastic resin (b) (hereinafter, it is abbreviated as "welding temperature") and the welding temperature of the thermoplastic resin (c) because the degree of freedom in design in the welding step can improve. Here, as the welding temperature, the melting point or more of the thermoplastic resin is preferably used when the thermoplastic resin is a crystalline resin, and the glass transition temperature or more of the thermoplastic resin is preferably used when the thermoplastic resin is an amorphous resin. Therefore, when the difference ΔT between Tb and Tc is 50° C. or more, the difference in welding temperature between the surfaces can sufficiently increase, which is preferable. When the difference ΔT between Tb and Tc is 200° C. or less, it is possible to suppress thermal decomposition of one of the surfaces at the welding temperature of the other surface when each of the surfaces is welded, which is preferable. When the both surfaces are welded at a certain welding temperature, the difference ΔT between Tb and Tc is preferably 50° C. or more and 150° C. or less from the viewpoint of being able to impart a sufficient temperature for welding to the joining portion while further suppressing thermal decomposition of the both surfaces. From the viewpoint of increasing the degree of freedom in design, the difference ΔT between Tb and Tc is preferably 100° C. or more. According to the production method of the present invention described later, it is possible to obtain a fiber-reinforced plastic substrate having a strong joining state even in the case of a combination of resins having a large welding temperature difference like this.

The melting point and/or the glass transition temperature here may be determined using a differential scanning calorimeter (DSC). A sample of 1 to 5 mg is filled in a sealed-type sample container having a volume of 50 μl, the temperature is raised at a temperature raising rate of 10° C./min, a step on a DSC curve detected in a range of 30 to 400° C. is used as an index of a glass transition point, an exothermic peak is used as an index of a melting point, and the respective temperatures are defined as the glass transition temperature and the melting point.

At least one of the melting temperature Tb of the component [B] and the melting temperature Tc of the component [C] is preferably 250° C. or less. In the step of impregnating the reinforcing fibers with the thermoplastic resin or the step of integrating the reinforcing fibers with another member, the temperature is more preferably 230° C. or less, and further preferably 210° C. or less from the viewpoint of facilitating the integration by thermal welding. The lower limit of the melting temperature is not particularly limited, and is preferably 100° C. or more, and more preferably 130° C. or more from the viewpoint of the heat resistance of the resulting fiber-reinforced plastic substrate.

(Hansen Solubility Parameter)

In the fiber-reinforced plastic substrate according to the first aspect of the present invention, in the relationship between the thermoplastic resin (b) constituting the component [B] and the thermoplastic resin (c) constituting the component [C], it is essential that the distance $Ra_{(bc)}$ between Hansen solubility parameters of the thermoplastic resins satisfies the formula (1).

$$Ra_{(bc)} = \{4(\delta DB - \delta DC)^2 + (\delta PB - \delta PC)^2 + (\delta HB - \delta HC)^2\}^{1/2} \geq 8 \quad \text{Formula (1)}$$

$Ra_{(bc)}$: distance between Hansen solubility parameters of the component [B] and the component [C]

δDB: energy due to intermolecular dispersive power of the component [B]

δDC: energy due to intermolecular dispersive power of the component [C]

δPB: energy due to intermolecular dipole interaction of component [B]

δPC: energy due to intermolecular dipole interaction of component [C]

δHB: energy due to intermolecular hydrogen bonding of the component [B]

δHC: energy due to intermolecular hydrogen bonding of the component [C].

The value of each term constituting the distance $Ra_{(bc)}$ between Hansen solubility parameters may also be obtained by Hansen Solubility Parameter in Practice (HSPiP) ver. 5.0.06. Here, the solubility of a sample is determined using various solvents having different solubilities, and this solubility information is analyzed by HSPiP to calculate the Hansen solubility parameter. In the formula, δD, δP, and δH represent a dispersion term, a polarity term, and a hydrogen bond term in Hansen solubility parameter, respectively. Examples of the various solvents different in solubility here include n-hexane, cyclohexane, methyl isobutyl ketone, n-butyl acetate, toluene, tetrahydrofuran, methyl ethyl ketone, chloroform, methyl acetate, acetone, 1,4-dioxane, pyridine, N-methylpyrrolidone, hexafluoroisopropanol, 1-butanol, acetonitrile, diethylene glycol, N,N-dimethylformamide, γ-butyrolactone, ethanol, dimethylsulfoxide, methanol, 2-aminoethanol, cyclohexanone, 1,1,2,2-tetrabromoethane, and the like, and may be selected therefrom.

The fact that the distance $Ra_{(bc)}$ between the Hansen solubility parameters is 8 or more indicates that the affinity between the component [B] and the component [C] is very low. Therefore, in conventional techniques, a strong joining state cannot be obtained between the component [B] and the component [C]. In the present invention, by the component [A] having the above-described anchoring structure, it is possible to easily obtain a strong joining state at the boundary between the components [B] and [C] even in the case of a combination of thermoplastic resins that was conventionally impossible, particularly, a combination in which the distance $Ra_{(bc)}$ between the Hansen solubility parameters of the thermoplastic resins shows a large value. At this time, the distance $Ra_{(bc)}$ is preferably 10 or more from the viewpoint of enhancing the degree of freedom in designing the combination of resins. The upper limit of the distance $Ra_{(bc)}$ is not particularly limited, and when it is 30 or less, the degree of freedom in designing a combination of resins can be satisfied.

In the present invention, the resin area including the thermoplastic resin (b) which is the component [B] is present on the surface of one side of the fiber-reinforced plastic substrate. The thermoplastic resin (b) may be present on a place other than the surface. On the other hand, the resin area including the thermoplastic resin (c) which is the component [C] is preferably present on the surface opposite to the surface where the resin area including the thermoplastic resin (b) is present.

The resin area including the component [B] or the resin area including the component [C] may be present on the entire surface or a part of one surface of the reinforcing fiber plastic substrate.

In addition, it is preferable that the resin area including the component [B] and the resin area including the component [C] are each formed in a layer and adjacent to each other to form a boundary. This is preferable because the joining strength between the resin area including the component [B] and the resin area including the component [C] increases, and the homogeneity of the fiber-reinforced plastic substrate increases.

In the reinforcing fiber plastic substrate of the present invention, it is preferable that each of δHB of the component [B] and δHC of the component [C] is 1.0 or more from the viewpoint of enhancing the adhesiveness to reinforcing fibers constituting the component [A], particularly to carbon fibers. It is more preferable that δHB and δHC are 2.0 or more.

In the reinforcing fiber plastic substrate of the present invention, either or both of the distance $Ra_{(ab)}$ between the Hansen solubility parameters of the component [A] and the component [B] and the distance $Ra_{(ac)}$ between the Hansen solubility parameters of the component [A] and the component [C] are preferably less than 8. With such a relationship, even when the component [B] and the component [C] have a combination in which the distance $Ra_{(bc)}$ between the Hansen solubility parameters is a large value, it is possible to obtain a fiber-reinforced plastic substrate having a strong joining state via the component [A]. From the viewpoint of developing a stronger joining state, either or both of the distances $Ra_{(ab)}$ and $Ra_{(ac)}$ are more preferably less than 7, and further preferably less than 6.

(Fiber-Reinforced Plastic Substrate)

The thickness of the fiber-reinforced plastic substrate of the present invention is not particularly limited, and is preferably 0.1 mm or more, more preferably 0.3 mm or more, and further preferably 0.5 m or more from the viewpoint of handleability and lightweight property. By having a thickness of 0.1 mm or more, the degree of freedom in design is high in the case of being used as a joining medium for integrating with another member, and this can also contribute to weight reduction. On the other hand, when the fiber-reinforced plastic substrate itself is used as a member, the thickness is preferably 1 mm or more, more preferably 3 mm or more, and further preferably 5 mm or more. The upper limit of the thickness is not particularly limited, and as long as the thickness is 50 mm or less, it can be sufficiently utilized as a joining medium or a member.

When the resin area including the component [B] and the resin area including the component [C] are each formed in a layer and adjacent to each other, the ratio of the thicknesses of the resin area including the element [B] and the resin area including the component [C] is not particularly limited, but is preferably 1:9 to 9:1, more preferably 2:8 to 8:2, and further preferably 3:7 to 7:3 from the viewpoint of mass productivity and flatness of the fiber-reinforced plastic substrate. From the linear expansion coefficient of the resin to be used and the volume content rate of the reinforcing fibers, the thickness ratio may also be adjusted such that the resulting fiber-reinforced plastic substrate becomes flat.

[Roughness Average Length, Roughness Average Height]

In the fiber-reinforced plastic substrate of the present invention, there are reinforcing fibers of the component [A] present across the boundary between the resin area including the component [B] and the resin area including the component [C] and included in both resin areas. In addition, as shown in FIG. 1, in observation of a cross section perpendicular to the fiber-reinforced plastic substrate, that is, a cross section obtained by cutting the substrate perpendicularly to a plane formed by the fiber-reinforced plastic substrate in a direction of 45 degrees, regardless of clockwise or counterclockwise, with respect to the fiber direction of the component [A] in a plan view of the fiber-reinforced plastic substrate, it is preferable that the roughness average length RSm defined in JIS B0601(2001) of a cross-section curve formed by the boundary between the resin area including the component [B] and the resin area including the component [C] is 100 μm or less, and the roughness average height Rc is 3.5 μm or more. The roughness average height Rc is preferably 10 μm or more from the viewpoint of exhibiting stronger adhesive strength of the boundary.

Figure 2:
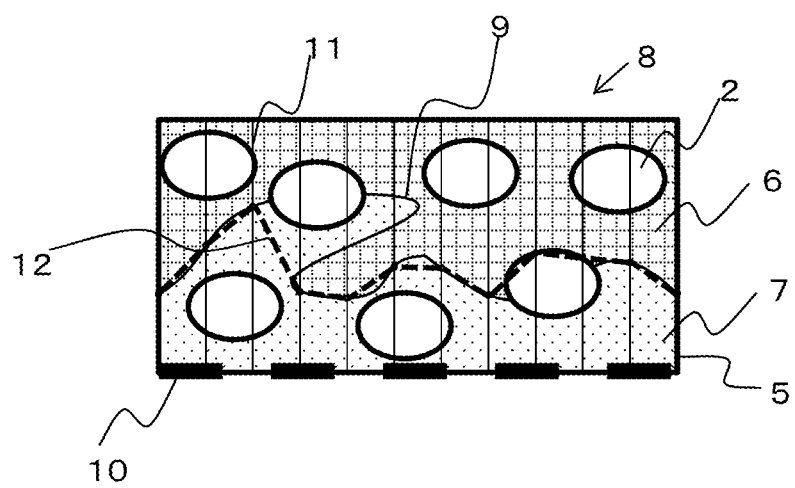
FIG. 2 is a schematic view of an observation cross section of the fiber-reinforced plastic substrate according to the first aspect of the present invention.

As shown in FIG. 2, the presence of the reinforcing fibers of the component [A] across the boundary between the resin area including the component [B] and the resin area including the component [C] included in both resin areas improves the strength of the resin area including the component [C] and improves the joining strength.

The presence of [A] included in both resin areas across the boundary between both resin areas can be confirmed by observing a cross section obtained by cutting the substrate perpendicularly to the planar direction. One example is shown with FIG. 2. In the observation cross section 8 of FIG. 2, the resin area 6 including the component [B] of the fiber-reinforced plastic substrate is in close contact with the resin area 7 including the component [C], and a surface where the resin area 6 including the component [B] and the resin area 7 including the component [C] are in close contact with each other is illustrated as a boundary 9. A plurality of components [A]2 are present on the boundary 9. The component [A]2 on the boundary 9 is in contact with both of the resin area 6 including the component [B] and the resin area 7 including the component [C]. The state in which the component [B] and the component [C] are in contact with the periphery of the reinforcing fiber as described above may be said to be a state in which the reinforcing fiber is "included in both resin areas across the boundary".

Chemical and/or physical bond of the component [A] present on the boundary to the component [B] and the component [C] improves adhesion force between the resin area including the component [B] and the resin area including the component [C]. The number of components [A] present on the boundary may be one or more. The upper limit of the number is not particularly limited, and is preferably 200 or less in the range of 500 μm square in an image observed by a method described later.

The boundary between the resin area including the component [B] and the resin area including the component [C] is observed in a cross section perpendicular to the fiber-reinforced plastic substrate when the cross section is obtained in a direction of 45 degrees, regardless of clockwise or counterclockwise, with respect to the fiber direction of the component [A] in a plan view of the fiber-reinforced plastic substrate. In this case, it is preferable to observe a portion where all the components [A], [B], and [C] of the cross section are present. By observing the aspect of the resin area at the boundary in such a cross section, it is possible to simultaneously evaluate the adhesion forces in the fiber direction and in the direction orthogonal thereto.

In such cross-sectional observation, when the roughness average length RSm defined in JIS B0601(2001) of the cross-section curve formed by the boundary is 100 μm or less, it becomes easy for the component [A] to be present in such a manner to cross the boundary between the resin area including the component [B] and the resin area including the component [C], and the above-described adhesion force improvement effect is likely to be obtained. In addition, not only chemical or/and physical bonding force but also mechanical bonding force of entanglement between the resin area including the component [B] and the resin area including the component [C] at the boundary is applied, and the resin area including the component [B] and the resin area including the component [C] are less likely to separate from each other. The lower limit value of the roughness average length RSm is not particularly limited, and is preferably 15 μm or more from the viewpoint of avoiding a decrease in mechanical bonding force due to stress concentration. When the roughness average height Rc of the cross-section curve is 3.5 μm or more, the mechanical bonding force due to entanglement increases, and it becomes easy for the component [A] to be present in such a manner to cross the boundary between the resin area including the component [B] and the resin area including the component [C], and the adhesion force between the resin area including the component [B] and the resin area including the component [C] improves, which is preferable. The roughness average height Rc of the cross-section curve is more preferably 10 μm or more, and particularly preferably 20 μm because the component [A] is easily included in both resin areas and the adhesion force further improves. The upper limit value is not particularly limited, and is preferably 100 μm or less from the viewpoint of avoiding a decrease in mechanical bonding force due to stress concentration.

Here, as a method of measuring the roughness average height Rc and the roughness average length RSm of the cross-section curve, a known method may be used. Examples thereof include a method of measuring them from a cross-sectional image acquired using X-ray CT, a method of measuring them from an elemental analysis mapping image by an energy dispersive X-ray spectrometer (EDS), and a method of measuring them from a cross-sectional observation image by an optical microscope, a scanning electron microscope (SEM), or a transmission electron microscope (TEM). In the observation, the component [B] and/or the component [C] may be stained to adjust the contrast. In the image obtained by any of the above methods, the roughness average height Rc and the roughness average length RSm of the cross-section curve are measured in the range of 500 μm square.

One example of a method of measuring the roughness average height Rc and the roughness average length RSm of the cross-section curve is shown with FIG. 2. In the observation image 8 shown in FIG. 2, the resin area 6 including the component [B] is in close contact with the resin area 7 including the component [C], and the boundary between the resin area including the component [B] and the resin area including the component [C] in the observation image 8 is illustrated as a boundary 9. A plurality of components [A]2 are present on the boundary 9.

One example of a method of measuring the roughness average height Rc and the roughness average length RSm of the cross-section curve (cross-section curve element measurement method 1) is shown. Vertical base lines 11 are drawn at an interval of 5 μm from the resin area 7 including the component [C] toward the resin area 6 including the component [B] with an end portion 10 on the side of the resin area including the component [C] of the rectangular observation image 8 as a reference line. Points at which the vertical base lines drawn from the reference line intersect the component [B] for the first time are plotted, and a line connecting the plotted points is defined as a cross-section curve 12. Filtering processing based on JIS B0601(2001) is performed on the obtained cross-section curve 12, and the roughness average height Rc and the roughness average length RSm of the cross-section curve 12 are calculated.

(Integrated Molded Article)

The fiber-reinforced plastic substrate in the present invention may be formed into an integrated molded article by being joined to another member via the component [B] and/or the component [C].

Here, as another member, for example, a member made of a metal material such as aluminum, iron, magnesium, titanium, or an alloy thereof, a member made of the fiber-reinforced plastic substrate, or a member made of a thermoplastic resin composition may be used. When a thermoplastic resin composition reinforced with reinforcing fibers is used as another member, lightweight properties that cannot be achieved when a metal material is employed are obtained, which is preferable.

Here, another member preferably includes a thermoplastic resin from the viewpoint of weldability with the component [B] and/or the component [C]. It is preferable that the thermoplastic resin included in another member and the thermoplastic resin included in the portion of the fiber-reinforced plastic substrate to be joined to (in contact with) the another member are the same kind of resin. Furthermore, another member may appropriately contain another filler or additive as long as the object of the present invention is not impaired depending on the use and the like. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

Examples of the form of another member include a rib, a boss, a rising wall, and the like, and in particular, it is preferable to join a rib structure to the fiber-reinforced plastic substrate from the viewpoint of achieving both the lightness and the mechanical properties of the molding. Examples of such a rib structure include linear arrangement on the fiber-reinforced plastic substrate and arrangement as crossed cross ribs.

The method for joining another member to the fiber-reinforced plastic substrate of the present invention is not particularly limited, and examples thereof include thermal welding, vibration welding, ultrasonic welding, resistance welding, induction welding, laser welding, insert injection molding, and outsert injection molding. In particular, injection molding such as insert injection molding or outsert injection molding is preferably used because it is high speed and excellent in productivity.

Regarding the strength of the joining portion of the integrated molded article of the present invention, the tensile joining strength measured based on the joining strength between the fiber-reinforced plastic substrate and another member which is described later is preferably 10 MPa or more, more preferably 15 MPa or more when the test environment temperature is 23° C. In applications where mechanical properties at high temperatures are required, it is preferable that high joining strength is exhibited even when the test environment temperature is 80° C. for example.

(Method for Producing Fiber-Reinforced Plastic Substrate)

In the method for producing a fiber-reinforced plastic substrate according to the present invention, a drawing step, a first impregnating step, and a second impregnating step described later are continuously performed in this order while the component [A] is caused to travel.

Figure 3:
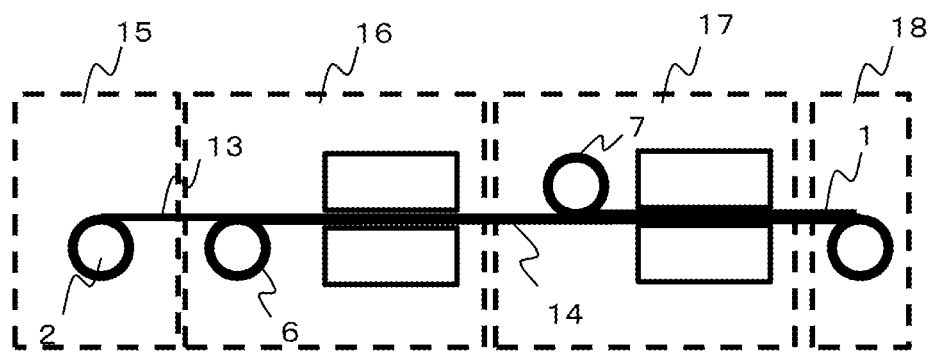
FIG. 3 is a schematic view of a method for producing a fiber-reinforced plastic substrate according to the first aspect of the present invention.

Here, continuously performing the steps while causing the component [A] to travel means continuously feeding the component [A] to each step without stopping the component [A] using a roll or a belt as illustrated in FIG. 3. Sequentially performing respective steps in this order can reduce the manufacturing cost of the substrate.

<Drawing Step>

The drawing step according to the present invention is a step of obtaining a reinforcing fiber continuous reinforcing fiber sheet in which the continuous component [A] is aligned and arranged in one direction, and then supplying the obtained continuous reinforcing fiber sheet including the component [A] in the fiber direction toward a subsequent step. An example is a step of unwinding and aligning yarns of the component [A] from a bobbin arranged on a creel or the like to obtain a sheet-like continuous reinforcing fiber sheet, and leading the sheet to the next step. An opening step may be included before and/or after the alignment of the component [A]. After the alignment, a woven fabric obtained through a loom by using auxiliary fiber yarns as weft yarns may be guided as the continuous reinforcing fiber sheet. The auxiliary fibers at this time may be the same fibers as or different fibers from the component [A]. It is preferable to directly obtain the continuous reinforcing fiber sheet from yarns because the manufacturing cost is suppressed as compared with the case of undergoing warping or partial warping (beaming). By arranging the component [A] included in the continuous reinforcing fiber sheet in one direction, a fiber-reinforced plastic substrate having excellent specific strength in the fiber direction and of low cost can be obtained.

Figure 4:
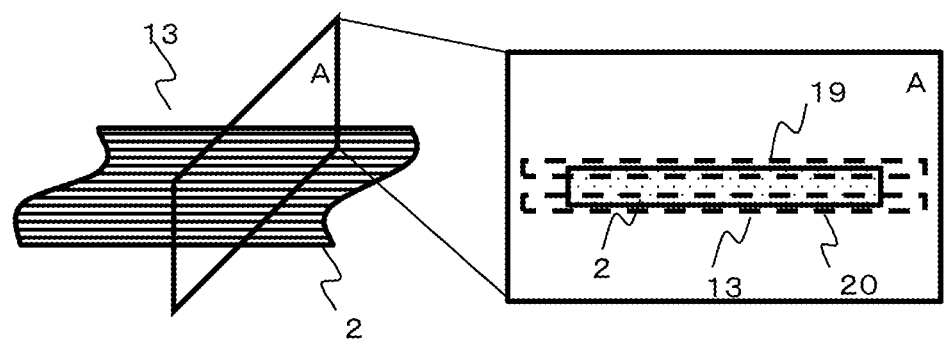
FIG. 4 is a schematic view of a continuous fiber-reinforced sheet in the production method of the first aspect of the present invention.

The continuous reinforcing fiber sheet obtained in the drawing step of the present invention will be described with FIG. 4. The continuous fiber-reinforced sheet 13 shown in FIG. 4 includes the component [A]2, and a cross section thereof is shown in a cross section A. The continuous fiber-reinforced sheet has two opposing surfaces, a first surface 19 and a second surface 20, and in the first impregnating step and the second impregnating step described later, each of the component [B] and the component [C] is impregnated from these surfaces. However, the scope of the present invention is not limited to the steps exemplified in FIG. 4.

The yarn of the component [A] may be formed of a plurality of fibers of the same form, or may be composed of a plurality of fibers of different forms. The number of reinforcing fibers constituting a single yarn of the component [A] is usually 300 to 60,000, and is preferably 300 to 48,000, and more preferably 1,000 to 24,000 in consideration of the production of the substrate. The range may be a combination of any of the upper limits and any of the lower limits shown above.

<First Impregnating Step>

Figure 5:
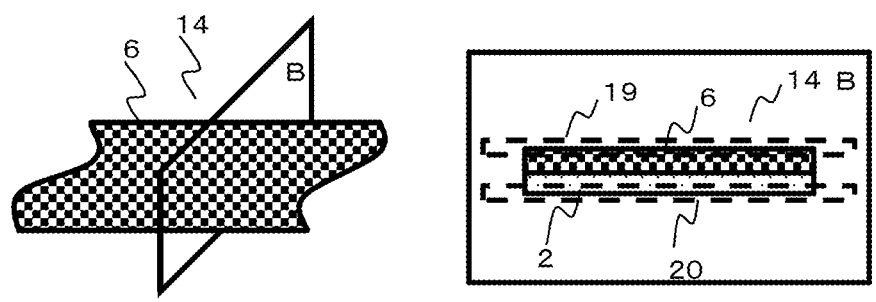
FIG. 5 is a schematic view of a fiber-reinforced plastic intermediate in the production method of the first aspect of the present invention.

The production method according to the present invention includes, after the drawing step, a step of impregnating the continuous reinforcing fiber sheet with the component [B] from one surface thereof to obtain a fiber-reinforced plastic intermediate in which the component [B] is present in a first surface. The fiber-reinforced plastic intermediate obtained in the first impregnating step will be described with FIGS. 4 and 5. The continuous reinforcing fiber sheet 13 is impregnated with a component [B]6 from a first surface 19 in the cross section A of FIG. 4, and a fiber-reinforced plastic intermediate 14 having a cross section as in a cross section B of FIG. 5 is obtained. Here, the first surface 19 of the fiber-reinforced plastic intermediate 14 is covered with the component [B]6. However, the scope of the present invention is not limited to the steps illustrated in FIG. 4 and FIG. 5.

In the first impregnating step, the state in which the component [B] is present in the first surface is not particularly limited, and it is preferable that the component [B] is disposed on the first surface. Here, "the component [B] is disposed" means that 80% or more of the first surface is covered. When 80% or more of the surface is covered with the component [B], joining property can be imparted to the resulting fiber-reinforced plastic substrate. Furthermore, a step of obtaining a fiber-reinforced plastic intermediate in which the first surface is completely covered with the component [B] is more preferable. Such a step is preferable because it is possible to prevent the component [C] from being exposed at or/and coming around the first surface when the component [C] is impregnated in the second impregnating step described later.

<Impregnation>

The method for obtaining a fiber-reinforced plastic intermediate by impregnating the component [B] from one surface of the continuous reinforcing fiber sheet is not particularly limited, and examples thereof include a method for obtaining a fiber-reinforced plastic intermediate by disposing the component [B] in a sheet shape such as a film or a nonwoven fabric on the first surface of the continuous fiber-reinforced sheet, subsequently heating the component [B] to bring it into a molten state, impregnating the continuous fiber-reinforced sheet with the component [B], and then cooling the continuous fiber-reinforced sheet, and a method for obtaining a fiber-reinforced plastic intermediate by attaching the component [B] in a molten state to the first surface of the continuous fiber-reinforced sheet, subsequently impregnating the continuous fiber-reinforced sheet with the component [B], and then cooling the continuous fiber-reinforced sheet. The method of disposing the component [B] in a sheet shape is preferable because the basis weight of the component [B] can be stabilized. The method of applying the component [B] in a molten state to the continuous fiber-reinforced sheet is preferable from the viewpoint of manufacturing cost.

As the method for heating the sheet-shaped component [B] after disposing the component [B] on the first surface, a known method can be used. Examples thereof include a non-contact heating method such as using a far infrared heater, a high-temperature oven or induction heating, and a method of heating by bringing into contact with a heated roll or belt. Among them, a method of heating through a tank of a far-infrared heater or a high-temperature oven is preferable from the viewpoint of temperature control.

The method for attaching the molten component [B] to the first surface is not particularly limited, and known methods may be used. Among them, dipping or coating is preferable.

Here, the dipping refers to, for example, a method in which the component [B] is supplied to a melting bath using a pump and the continuous fiber-reinforced sheet is caused to pass through the melting bath. The component [B] can be reliably attached to the continuous fiber-reinforced sheet by immersing the continuous fiber-reinforced sheet in a melting bath.

The coating refers to, for example, a method of applying the component [B] to the continuous fiber-reinforced sheet using a coating means such as a reverse roll, a forward rotating roll, a kiss roll, an applicator, a spray, or a curtain. Here, the reverse roll, the forward rotating roll, and the kiss roll refer to a method in which the component [B] melted in a pump is supplied to a roll to apply a melt of the component [B] to the continuous fiber-reinforced sheet. The reverse roll is a method in which two rolls rotate in opposite directions to each other to apply the molten component [B] onto the roll, and the forward rotating roll is a method in which two rolls rotate in the same direction to apply the molten component [B] onto the roll. Usually, in the reverse roll and the forward rotating roll, a method is used in which the component [B] is transferred onto the continuous fiber-reinforced sheet by sandwiching the continuous fiber-reinforced sheet between two rolls, and the component [B] is reliably attached by further sandwiching the continuous fiber-reinforced sheet between other rolls. On the other hand, the kiss roll is a method in which the component [B] is attached only by bringing the continuous fiber-reinforced sheet into contact with one roll.

Therefore, the kiss roll is preferably used when the viscosity of the resin is relatively low. In any of the roll methods, a predetermined amount of the component [B] heated and melted is applied, and the continuous fiber-reinforced sheet is caused to travel while being bonded, whereby a predetermined amount of the component [B] can be attached per unit length of the continuous fiber-reinforced sheet. The spray uses the principle of atomizer, and is a method of spraying the molten component [B] in mist form onto the continuous fiber-reinforced sheet. The curtain is a method in which the molten component [B] is naturally dropped from a small hole and applied to the continuous fiber-reinforced sheet, or a method in which the component [B] is overflowed from a melting tank and applied to the continuous fiber-reinforced sheet. Because the amount required for application is easily adjusted, the loss of the component [B] can be reduced. The applicator is a method in which a predetermined amount of the component [B] is attached per unit length of the continuous fiber-reinforced sheet by discharging the molten component [B] from a small hole and causing the continuous fiber-reinforced sheet to travel while bringing the continuous fiber-reinforced sheet into contact with the component [B]. An applicator is preferably used from the viewpoint of being hardly affected by the viscosity of the component [B] and increasing the production speed.

Pressurization may be performed when the continuous fiber-reinforced sheet is impregnated with the molten component [B]. The method of pressurization is not particularly limited, and examples thereof include a method of applying pressure simultaneously with heating when the component [B] is heated by a reverse roll, a forward rotating roll, a kiss roll, an applicator, or a belt. A method of providing a pressing portion formed of a roll or a belt after the component [B] is attached to and melted in the continuous fiber-reinforced sheet may also be given. When the viscosity of the molten component [B] is low, pressurization is not necessarily required.

The fiber-reinforced plastic intermediate obtained by impregnating the continuous fiber-reinforced sheet with the component [B] is preferably cooled. The cooling method is not particularly limited, and a known method may be used. For example, non-contact cooling by a temperature control bath or a blower, or contact cooling by contacting with a temperature-controlled roll or belt may be used. Among them, a method of bringing the intermediate into contact with a temperature-controlled roll or belt is preferable from the viewpoint of temperature control, and is preferable because it can also serve as a pressurizing step after melting of the component [B].

<Temperature of Fiber-Reinforced Plastic Intermediate>

The temperature of the fiber-reinforced plastic intermediate after the first impregnating step and before the second impregnating step is preferably 70 to 180° C. By having the temperature within such a range, thermal decomposition or reaction runaway of the component [C] by heat of the fiber-reinforced plastic intermediate hardly occurs in the second impregnating step described later, and the component [C] is appropriately heated, and thus the impregnation property into the fiber-reinforced plastic intermediate improves. From the viewpoint of reliably preventing thermal decomposition or reaction runaway, the temperature of the fiber-reinforced plastic intermediate is more preferably 150° C. or less. From the viewpoint of improving the impregnation property, the lower limit is more preferably 90° C. or more.

<Second Impregnating Step>

Figure 6:
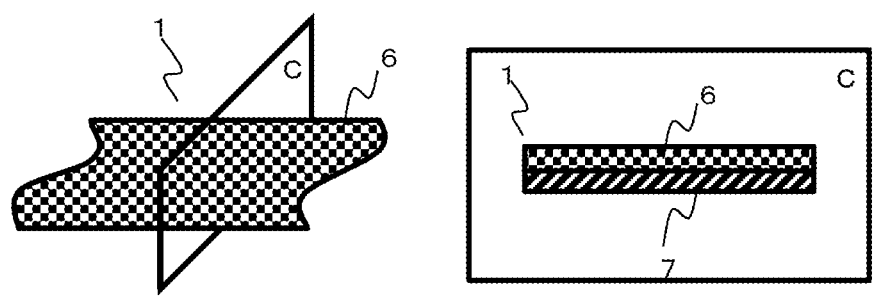
FIG. 6 is a schematic view of the fiber-reinforced plastic substrate according to the first aspect of the present invention.

The production method according to the present invention includes, after starting the first impregnating step, a step of impregnating the component [C] from a second surface opposite to the first surface to obtain a fiber-reinforced plastic substrate (second impregnating step). The fiber-reinforced plastic substrate obtained in the second impregnating step will be described with FIGS. 5 and 6. The component [C]7 is impregnated into the continuous reinforcing fiber sheet 13 from a second surface 20 in a cross section B in FIG. 5, and the fiber-reinforced plastic substrate 1 having a cross section like a cross section C in FIG. 6 is obtained. Here, a first surface 19 of the fiber-reinforced plastic substrate 1 is covered with the component [B]6, and the second surface 20 is covered with the component [C]. However, the scope of the present invention is not limited to the steps illustrated in FIGS. 5 and 6. The second impregnating step may be started before completion of the first impregnating step.

[Impregnation]

The method for impregnating the component [C] from the second surface opposite to the first surface of the fiber-reinforced plastic intermediate is not particularly limited, and examples thereof include a method for obtaining a fiber-reinforced plastic intermediate by disposing the component [C] in a sheet shape on the second surface of the fiber-reinforced plastic intermediate, subsequently heating the component [C] to bring it into a molten state, and subsequently cooling it, and a method for obtaining a fiber-reinforced plastic intermediate by applying the component [C] in a molten state to the second surface of the fiber-reinforced resin intermediate, and subsequently cooling it. The method of disposing the component [C] in the form of a film or a nonwoven fabric sheet is preferable because the basis weight of the component [C] can be stabilized. The method of applying the component [C] in a molten state to the fiber-reinforced plastic intermediate is preferable from the viewpoint of production cost.

<Take-Up Step>

After the second impregnating step, a step of taking up the fiber-reinforced plastic substrate may be included. In the take-up step, the fiber-reinforced substrate may be wound around a winding section, or may be introduced into a device such as an ATP device, an AFP device, a slit device, or a cutting device without being wound and continuously subjected to another step. In the case of winding, a release paper or a protective film may be supplied to the second surface of the fiber-reinforced plastic substrate. Supplying a release paper or a protective film is preferable because the second surface of the fiber-reinforced plastic substrate can be prevented from being in close contact with or adhering to the first surface of the fiber-reinforced plastic substrate on the inner layer during winding.

The speed of the fiber-reinforced plastic substrate at the time of taking up is preferably 0.1 m/min or more. By having the speed within such a range, a fiber-reinforced plastic substrate can be continuously obtained. It is more preferably 1 m/min or more from the viewpoint of productivity, and more preferably 5 m/min or more from the viewpoint of process requirements for structural members.

In the method for producing a fiber-reinforced plastic substrate of the present invention, the impregnation of the component [B] into the component [A] and the impregnation of the component [C] into the component [A] may be separately performed. In the case of impregnating reinforcing fibers with different types of thermoplastic resins, a method is exemplified in which a temperature at which both of the different resins can be molded is selected, and the different types of resins are simultaneously impregnated at the molding temperature (Patent Documents 1 and 2). When impregnation is performed at the same time, the molding pressure cannot be adjusted according to resin, and thus it is very difficult to control the boundary position between both resins, and a limited combination of resins is required, which is not preferable. The production method of the present invention is preferable in that any resin viscosity and molding pressure can be set by changing the molding temperature in the first impregnating step and the second impregnating step, the degree of freedom in designing the production conditions is large, and the boundary position between the component [B] and the component [C] can be easily adjusted.

(Application)

The fiber-reinforced plastic substrate and the integrated molded article according to the first aspect of the present invention are preferably used for aircraft structural members, wind turbine blades, automobile external plates, computer applications such as IC trays and housings of notebook computers, and further, for sports applications such as golf shafts and tennis rackets.

[Second Aspect]

Next, a fiber-reinforced plastic substrate according to a second aspect of the present invention will be described.

The fiber-reinforced plastic substrate of the present invention is a fiber-reinforced plastic substrate in which a resin area (B') including the component [B'], a fiber-reinforced plastic area (E) including the component [D] and the component [A], and a resin area (C') including the component [C'] are adjacent in this order to form a boundary.

It is preferable that the resin area (B') including the component [B'], the resin area (C') including the component [C'], and the fiber-reinforced plastic area (E) including the component [D] and the component [A] are each formed in a layer and adjacent to each other to form a boundary.

Figure 9:
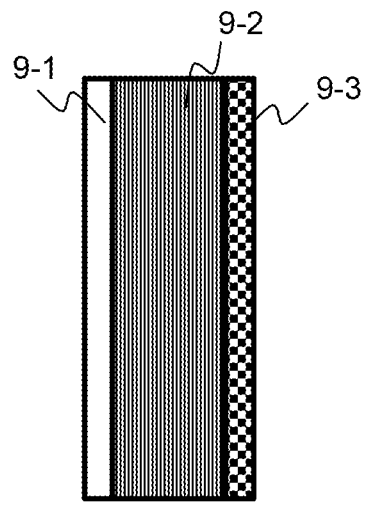
FIG. 9 is a schematic view of one example of a fiber-reinforced plastic substrate according to a second aspect of the present invention in which a resin area (B'), a fiber-reinforced plastic area (E), and a resin area (C') are adjacent in order.

Here, the state that the resin area (B'), the fiber-reinforced plastic area (E), and the resin area (C') are adjacent in this order is, for example as shown in FIG. 9, a state in which the fiber-reinforced plastic area (E) has opposite surfaces, the resin area (B') is in contact with one surface of the fiber-reinforced plastic area (E), and the resin area (C') is in contact with the other surface of the fiber-reinforced plastic area (E). With such a configuration, the resin area (B') and the resin area (C') can be easily disposed on the fiber-reinforced plastic area (E). FIG. 9 shows an example in which a resin area (B') including the component [B'], the resin area (C') including the component [C'], and the fiber-reinforced plastic area (E) including the component [D] and the component [A] are each formed in a layer and adjacent to each other.

In the fiber-reinforced plastic substrate of the present invention, it is essential that the compatibility parameter (SP value) satisfies formula (3) in the relationship between the component [B'] constituting the resin area (B') and the component [C'] constituting the resin area (C').

$$2 < \Delta SP \leq 10 \qquad \text{Formula (3)}$$

ΔSP: absolute value of difference between SPb and SPc
SPb: SP value of the component [B'] [ $(MPa)^{1/2}$ ]
SPc: SP value of the component [C'] [ $(MPa)^{1/2}$ ].

When the resin area (B') or the resin area (C') and a material to be welded are welded to the fiber-reinforced plastic substrate of the present invention at a high speed, a high temperature and a high pressure are generally applied in a short time. Under such conditions, a so-called molding defect may occur, in which the material to be welded melts and flows, and flows into a place other than a desired place to be welded. At this time, because the difference between SPb and SPc satisfies the relationship of the formula (3), even if an unintended adhesion occurs, for example, a welding target material to be welded to the resin area (B') comes around the resin area (C') side, the welding is not performed with the resin area (C'), and unnecessary portions can be easily removed. In addition, in the case of welding the resin area (C') and the new material to be welded in the next step, even if the new material to be welded comes around the resin area (B') side, the welding is not performed with the resin area (B'), and unnecessary portions can be easily removed. This makes it possible to achieve both the shortening of the welding step by the high-temperature and high-pressure process and the simple repair of generated molding defect. From such a viewpoint, the absolute value ΔSP of the difference between SPb and SPc is more preferably 3 or more and 10 or less. From such a viewpoint, it is preferable that the resin area (B') forms one surface of the fiber-reinforced plastic substrate, and the resin area (C') forms the other surface on the opposite side of the fiber-reinforced plastic substrate.

The fact that ΔSP is larger than 2 indicates that the affinity between the resin area (B') and the resin area (C') is low. However, in the present invention, by having the fiber-reinforced plastic area (E) interposed between the resin area (B') and the resin area (C'), and having an anchoring structure at the boundary between the resin area (B') and the fiber-reinforced plastic area (E) and/or the boundary between the resin area (C') and the fiber-reinforced plastic area (E) as described later, a strong joining state can be easily obtained at the boundary.

The SP value may be obtained from Hansen Solubility Parameter in Practice (HSPiP) ver. 5.0.06. Here, various solvents different in solubility are used, and the solubility of the sample of each solvent is determined, and this solubility information is analyzed by HSPiP to calculate the Hansen solubility parameter. The SP value in the present application is determined from each term of the Hansen solubility parameter with the following formula.

$$SP \text{ value} = (dD^2 + dP^2 + dH^2)^{1/2}$$

In the formula, dD, dP, and dH represent a dispersion term, a polarity term, and a hydrogen bond term in the Hansen solubility parameter, respectively.

Examples of the various solvents different in solubility here include n-hexane, cyclohexane, methyl isobutyl ketone, n-butyl acetate, toluene, tetrahydrofuran, methyl ethyl ketone, chloroform, methyl acetate, acetone, 1,4-dioxane, pyridine, N-methylpyrrolidone, hexafluoroisopropanol, 1-butanol, acetonitrile, diethylene glycol, N,N-dimethylformamide, γ-butyrolactone, ethanol, dimethylsulfoxide, methanol, 2-aminoethanol, cyclohexanone, and 1,1,2,2-tetrabromoethane.

Furthermore, the fiber-reinforced plastic substrate of the present invention preferably satisfies the following formula (4) in the relationship between the thermoplastic resin (b') constituting the resin area (B') and the thermoplastic resin (c') constituting the resin area (C').

$$50 \leq \Delta T' \leq 150 \qquad \text{Formula (4)}$$

ΔT': absolute value of difference between Tb' and Tc'
Tb': melting point of the thermoplastic resin (b') when the thermoplastic resin (b') is a crystalline resin, and glass transition temperature [° C.] of the thermoplastic resin (b') when the thermoplastic resin (b') is an amorphous resin
Tc': melting point of the thermoplastic resin (c') when the thermoplastic resin (c') is a crystalline resin, and glass transition temperature [° C.] of the thermoplastic resin (c') when the thermoplastic resin (c') is an amorphous resin When the fiber-reinforced plastic substrate of the present invention is joined to another member made of a thermoplastic resin, it is preferable to perform joining by welding because the thermoplastic resins are mixed in a molten state to improve the joining strength with another member. In the fiber-reinforced plastic substrate of the present invention, when each of the resin area (B') and the resin area (C') is welded to another member, it is preferable to increase the difference between the processing temperature in the step of welding another member to the resin area (B') (hereinafter, it is abbreviated as "welding temperature") and the welding temperature of the resin area (C') because the degree of freedom in design in the welding step can improve. Here, as the welding temperature, the melting point or more of the thermoplastic resin is preferably used when the thermoplastic resin is a crystalline resin, and the glass transition temperature or more of the thermoplastic resin is preferably used when the thermoplastic resin is an amorphous resin. Therefore, when the difference ΔT' between Tb' and Tc' is 50° C. or more, the difference in welding temperature between the areas can sufficiently increase, which is preferable. When the difference ΔT' between Tb' and Tc' is 150° C. or less, it is possible to suppress thermal decomposition of one of the resin areas at the welding temperature of the other resin area when each of the areas is welded, which is preferable. Furthermore, the difference ΔT' between Tb' and Tc' is preferably 50° C. or more and 100° C. or less. By having the difference within such a range, it is possible to apply a temperature sufficient for welding to the joining portion while further suppressing thermal decomposition of both of the areas, which is preferable.

The melting point and/or the glass transition temperature here may be determined using a differential scanning calorimeter (DSC) based on JIS K7121(2012). A sample of 1 to 10 mg is filled in a sealed-type sample container having a volume of 50 μl, the temperature is raised at a temperature raising rate of 10° C./min, a step on a DSC curve detected in a range of 30 to 400° C. is used as an index of a glass transition point, an exothermic peak is used as an index of a melting point, and the respective temperatures are defined as the glass transition temperature and the melting point.

Examples of the thermoplastic resin (b') and the thermoplastic resin (c') include polyester-based resin such as polyethylene terephthalate, polybutylene terephthalate, polytrimethylene terephthalate, polyethylene naphthalate, or liquid crystal polyester; polyolefin such as polyethylene, polypropylene, or polybutylene; styrene-based resin; urethane resin; polyamide-based resin such as aliphatic polyamide for example polyoxymethylene, polyamide 6, or polyamide 66, semi-aromatic polyamide, or alicyclic polyamide; polycarbonate; polymethyl methacrylate; polyvinyl chloride; polyarylene sulfide such as polyphenylene sulfide; polyphenylene ether; modified polyphenylene ether; polyimide; polyamideimide; polyetherimide; polysulfone; modified polysulfone; polyethersulfone; polyarylene ether ketone such as polyketone, polyether ketone, polyether ether ketone, or polyether ketone ketone; polyarylate; polyether nitrile; phenol-based resin; and phenoxy resin. These thermoplastic resins may be copolymers or modified products of the above-mentioned resins, or may be used by blending two or more kinds thereof.

Among them, at least one thermoplastic resin selected from the group consisting of polyolefin, polycarbonate, polyester, polyarylene sulfide, polyamide, polyoxymethylene, polyetherimide, polyethersulfone, and polyarylene ether ketone is preferable from the viewpoint of the balance between molding processability and heat resistance or mechanical properties.

Furthermore, the thermoplastic resin (b') and the thermoplastic resin (c') may appropriately contain another filler or additive within a range not impairing the object of the present invention depending on the use and the like. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

Furthermore, it is essential that the thermoplastic resin (c') satisfies the above-mentioned relationship of SP value with the thermoplastic resin (b'). Examples of the combination of the thermoplastic resin (b') and the thermoplastic resin (c') satisfying such a relationship include the following aspects.

As a first combination, it is preferable that the thermoplastic resin (b') is polyamide and the thermoplastic resin (c') is polyolefin. Such a combination is preferable because the degree of freedom in design of the bonding surface when another member is bonded (hereinafter, the degree of freedom in designing the bonding surface) improves, the welding temperature can be kept low, and the production cost can be kept low.

As a second combination, it is preferable that the thermoplastic resin (b') is a polyarylene sulfide and the thermoplastic resin (c') is a polyolefin. Such a combination is preferable because, in addition to that the degree of freedom in designing the bonding surface improves, the chemical resistance of the welded surface relatively improves, and an integrated molded article excellent in chemical resistance can be obtained.

As a third combination, it is preferable that the thermoplastic resin (b') is polyamide and the thermoplastic resin (c') is polyethersulfone. Such a combination is preferable because, in addition to that the degree of freedom in designing the bonding surface improves, processing can be performed at the same welding temperature, and the molding cycle is excellent.

As a fourth combination, it is preferable that the thermoplastic resin (b') is polyarylene sulfide and the thermoplastic resin (c') is polyethersulfone. Such a combination is preferable because, in addition to that the degree of freedom in designing the bonding surface improves, the heat resistance of the welded surface is excellent, and an integrated molded article that can be used even at a relatively high temperature such as 80° C. can be obtained.

As a fifth combination, it is preferable that the thermoplastic resin (b') is polyarylene ether ketone and the thermoplastic resin (c') is polyethersulfone. Such a combination is preferable because, in addition to that the degree of freedom in designing the bonding surface improves, the bonding surface is excellent in heat resistance and chemical resistance, and a highly reliable integrated molded article can be obtained.

Examples of the reinforcing fibers of the component [A] used in the present invention include glass fibers, carbon fibers, metal fibers, aromatic polyamide fibers, polyaramid fibers, alumina fibers, silicon carbide fibers, boron fibers, and basalt fibers. They may be used singly or in combination of two or more kinds thereof. These reinforcing fibers may be subjected to surface treatment. Examples of the surface treatment include a metal application treatment, a treatment with a coupling agent, a treatment with a sizing agent, and an additive adhesion treatment. In these reinforcing fibers, reinforcing fibers having conductivity are also included. As the reinforcing fibers, carbon fibers having a small specific gravity, high strength, and high elastic modulus are preferably used.

Examples of commercially available products of carbon fibers include "TORAYCA®" T800G-24K, "TORAYCA®" T800S-24K, "TORAYCA®" T700G-24K, "TORAYCA®" T700S-24K, "TORAYCA®" T300-3K, and "TORAYCA®" T1100G-24K (all manufactured by Toray Industries, Inc.).

The form and arrangement of the reinforcing fibers may be appropriately selected from the form of reinforcing fibers arranged in one direction, a layered product obtained by laminating a plurality of layers of reinforcing fibers arranged in one direction, a woven fabric, and the like. A layered product obtained by laminating a plurality of layers of reinforcing fibers arranged in one direction is preferable because a molded article that is lightweight, has higher standard of durability, and is less deformed in the welding step can be obtained. In this case, the reinforcing fibers may be arranged in one direction in each layer, and the reinforcing fibers included in different layers may be directed in different directions.

These forms may be obtained using a plurality of reinforcing fiber bundles formed of reinforcing fibers. The reinforcing fiber bundle may be formed of a plurality of fibers of the same form, or may be formed of a plurality of fibers of different forms. The number of reinforcing fibers constituting one reinforcing fiber bundle is usually 300 to 60,000, and is preferably 300 to 48,000, and more preferably 1,000 to 24,000 in consideration of production of a substrate. The range may be a combination of any of the upper limits and any of the lower limits shown above.

The reinforcing fiber of the component [A] is preferably a reinforcing fiber continuous over a length of 10 mm or more in at least one direction. The fiber-reinforced composite material does not have to be continuous over the entire width in the width direction, and may be divided in the middle.

The strand tensile strength of the reinforcing fibers of the component [A] is preferably 5.5 GPa or more as measured in accordance with the resin-impregnated strand test method of JIS R7608(2007) because an integrated molded article having small deformation in the welding step can be obtained. The strand tensile strength is more preferably 5.8 GPa or more from the viewpoint of a balance between lightness and mechanical properties of the integrated molded article to be obtained.

In the present invention, the fiber-reinforced plastic area (E) may be formed by impregnating an assembly of reinforcing fibers with the thermosetting resin (d). Examples of the impregnation method include a hand lay-up method, a filament winding method, a pultrusion method, a resin injection molding method, and a resin transfer molding method.

In the present invention, the fiber-reinforced plastic substrate may also be used in a state where the thermosetting resin (d) in the fiber-reinforced plastic area (E) is present as a cured product. Here, the cured product may be obtained by thermally curing the thermosetting resin (d) in the fiber-reinforced plastic area (E). Here, as a method of thermal curing, for example, a press molding method, an autoclave molding method, a bagging molding method, a wrapping tape method, an internal pressure molding method, or the like is adopted.

Temperature conditions for such thermal curing may be appropriately set according to the type of the thermosetting resin (d) and the type and amount of the curing agent and accelerator. For example, when an epoxy resin is included as the thermosetting resin (d) and diaminodiphenyl sulfone is used as an amine compound, a temperature condition of 180° C. for 2 hours may be suitably used, and when dicyandiamide is used as a curing agent, a temperature condition of 135° C. for 2 hours may be suitably used.

As a method for determining whether or not the thermosetting resin (d) present in the fiber-reinforced plastic area (E) is a cured product, differential scanning calorimetry may be exemplified. When the fiber-reinforced plastic area (E) is subjected to differential scanning calorimetry under an inert gas atmosphere at a heating rate of 10° C./min, the fiber-reinforced plastic area (E) is determined to be a cured product if the area of a peak appearing as an exothermic reaction (residual exotherm) is 50 J/g or less.

Examples of the thermosetting resin (d) used in the fiber-reinforced plastic area (E) include unsaturated polyester resins, vinyl ester resins, epoxy resins, phenol resins, urea resins, melamine resins, thermosetting polyimide resins, cyanate ester resins, bismaleimide resins, benzoxazine resins, copolymers and modified products thereof, and resins obtained by blending at least two of these resins. To improve impact resistance, an elastomer or a rubber component may be added. Among them, at least one selected from the group consisting of an epoxy resin, a phenol resin, an unsaturated polyester resin, a vinyl ester resin, and a thermosetting polyimide resin is preferable from the viewpoint of molding processability and mechanical properties.

Among them, an epoxy resin is preferable because it is excellent in mechanical properties, heat resistance, and adhesiveness to reinforcing fibers. Examples of the main agent of the epoxy resin include bisphenol type epoxy resins such as bisphenol A type epoxy resin, bisphenol F type epoxy resin, bisphenol AD type epoxy resin, and bisphenol S type epoxy resin; brominated epoxy resins such as tetrabromobisphenol A diglycidyl ether; epoxy resin having biphenyl skeleton; epoxy resin having naphthalene skeleton; epoxy resin having dicyclopentadiene skeleton; novolac-type epoxy resins such as phenol novolac-type epoxy resin and cresol novolac-type epoxy resin; glycidylamin type epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine; resorcin diglycidyl ether; and triglycidyl isocyanurate.

In the present invention, the thermosetting resin (d) includes an epoxy resin and includes 40 to 100 mass % of a glycidyl amine-type epoxy resin containing three or more glycidyl groups based on 100 mass % of the total epoxy resin, and thus a cured product having excellent heat resistance can be obtained, which is a more preferable aspect.

Examples of the glycidyl amine-type epoxy resin containing three or more glycidyl groups include N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, and N,N,N',N'-tetraglycidyl-m-xylylenediamine.

Examples of the curing agent of the epoxy resin include dicyandiamide, an aromatic amine compound, a phenol novolac resin, a cresol novolac resin, a polyphenol compound, an imidazole derivative, tetramethylguanidine, a thiourea-added amine, a carboxylic acid hydrazide, a carboxylic acid amide, and a polymercaptan.

Among them, by using an aromatic amine curing agent as the curing agent of the epoxy resin, an epoxy resin cured product having good heat resistance can be obtained. Examples of the aromatic amine compound include 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3',5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, and 3,3'-diaminodiphenyl sulfone.

Furthermore, the thermosetting resin (d) in the fiber-reinforced plastic area (E) preferably includes a thermoplastic resin component soluble in a thermosetting resin. By including a soluble thermoplastic resin component, the affinity with the thermoplastic resin (b') and the thermoplastic resin (c') improves, and the joining strength between the respective layers improves. Here, "soluble in a thermosetting resin" means that there is a temperature range in which a uniform phase is formed when a mixture of a thermoplastic resin component and a thermosetting resin is heated or heated and stirred. Here, "a uniform phase is formed" means that a state without visual separation is obtained. As long as a uniform phase is formed in a certain temperature range, separation may occur at a temperature other than the temperature range, for example, at room temperature.

The thermoplastic resin component soluble in a thermosetting resin is generally preferably a thermoplastic resin having a bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain. To obtain good heat resistance, the thermoplastic resin is one having a glass transition temperature of preferably 150° C. or more, more preferably 170° C. or more from the viewpoint of hardly causing thermal deformation when the thermoplastic resin is used as a molded body, and polyetherimide, polyethersulfone, and the like are preferable examples.

It is also one of preferable aspects from the viewpoint of improving the flame retardancy that the thermosetting resin (d) in the fiber-reinforced plastic area (E) contains a phosphorus compound. However, when the amount of the phosphorus compound is large, the bending strength of the fiber-reinforced plastic area (E) when the thermosetting resin (d) is cured may decrease. Thus, by having the phosphorus atom concentration in the thermosetting resin (d) of 0.01 mass % or more and 1.0 mass % or less, excellent bending strength can be achieved, which is preferable.

The fiber-reinforced plastic area (E) preferably has a bending strength of 150 MPa or more in a state in which the thermosetting resin (d) is present as a cured product whether or not the fiber-reinforced plastic area (E) contains a phosphorus compound, because the fiber-reinforced plastic area (E) exhibits excellent joining strength as an integrated molded article.

The fiber-reinforced plastic substrate of the present invention preferably has a mass of the resin area (B') per unit area of 10 g/m$^2$ or more. When the mass of the resin area (B') per unit area is 10 g/m$^2$ or more, an anchoring structure in which a part of the reinforcing fibers has come in the resin area (B') from the fiber-reinforced plastic area (E) is formed, and excellent joining strength can be exhibited. The mass of the resin area (B') per unit area is more preferably 20 g/m$^2$ or more. The upper limit of the mass of the resin area (B') per unit area may be, for example, 200 g/m$^2$ or less.

The fiber-reinforced plastic substrate of the present invention preferably has a mass of the resin area (C') per unit area of 10 g/m$^2$ or more. When the mass of the resin area (C') per unit area is 10 g/m$^2$ or more, an anchoring structure in which a part of the reinforcing fibers has come in the resin area (C') from the fiber-reinforced plastic area (E) is formed, and excellent joining strength can be exhibited. The mass of the resin area (C') per unit area is more preferably 20 g/m$^2$ or more. The upper limit of the mass of the resin area (C') per unit area may be, for example, 200 g/m$^2$ or less.

[Roughness Average Length, Roughness Average Height]

The fiber-reinforced plastic substrate according to the second aspect of the present invention preferably has a structure (anchoring structure) in which the reinforcing fibers of the component [A] are present across the boundary between the resin area (B') and the fiber-reinforced plastic area (E) and/or the boundary between the resin area (C') and the fiber-reinforced plastic area (E), and are included in both resin areas. In addition, in a case where a cross section perpendicular to the fiber-reinforced plastic substrate, that is, a cross section obtained by cutting the fiber-reinforced plastic substrate perpendicularly to a plane formed by the fiber-reinforced plastic substrate, is obtained in a direction of 45 degrees, regardless of clockwise or counterclockwise, with respect to the fiber direction of the component [A] in plan view, it is preferable that the roughness average length RSm defined in JIS B0601(2001) of the cross-section curve formed by the boundary of both resins is 100 μm or less and the roughness average height Rc is 3.5 μm or more. The roughness average height Rc is preferably 10 μm or more to have a stronger joining strength at the boundary.

The presence of [A] included in both resin areas across the boundary between both resin areas can be confirmed by observing a cross section obtained by cutting the substrate perpendicularly to the planar direction. One example is shown with FIG. 17. In the observation cross section 17-4 of FIG. 17, the resin area (B')17-2 of the fiber-reinforced plastic substrate is in close contact with the fiber-reinforced plastic area (E)17-3, and a surface where the resin area (B')17-2 and the fiber-reinforced plastic area (E)17-3 are in close contact with each other is illustrated as a boundary 17-5. A plurality of components [A]17-1 are present on the boundary 17-5. The component [A]17-1 on the boundary 17-5 is in contact with both the resin area (B')17-2 and the fiber-reinforced plastic area (E)17-3. The state in which the resin area (B') and the fiber-reinforced plastic area (E) are in contact with the periphery of the reinforcing fiber as described above may be said to be a state in which the reinforcing fiber is "included in both resin areas across the boundary". Such a state may be similarly applied between the resin area (C') and the fiber-reinforced plastic area (E).

The presence of the reinforcing fibers of [A] across the boundary between the resin area (B') and the fiber-reinforced plastic area (E) and/or the boundary between the resin area (C') and the fiber-reinforced plastic area (E) included in both resin areas improves the adhesion force of the boundary between the resin area (B') and the fiber-reinforced plastic area (E) and/or the boundary between the resin area (C') and the fiber-reinforced plastic area (E) by chemical and/or physical bond of the component [A] present on the boundary to the component [B'] of the resin area (B') and the component [D] of the fiber-reinforced plastic area (E) and/or the component [C'] of the resin area (C') and the component [D] of the fiber-reinforced plastic area (E). The number of components [A] present on the boundary may be one or more. The upper limit of the number is not particularly limited, and is preferably 200 or less in the range of 500 μm square in an image observed by a method described later.

The boundary between the resin area (B') and the fiber-reinforced plastic area (E) and/or the boundary between the resin area (C') and the fiber-reinforced plastic area (E) is observed in a cross section perpendicular to the fiber-reinforced plastic substrate in a direction of 45 degrees, regardless of clockwise or counterclockwise, with respect to the fiber direction of the component [A] in a plan view of the fiber-reinforced plastic substrate. By observing the aspect of the resin area at the boundary in such a cross section, it is possible to simultaneously evaluate the adhesion forces in the fiber direction and in the direction orthogonal thereto.

In such cross-sectional observation, when the roughness average length RSm defined in JIS B0601(2001) of the cross-section curve formed by the boundary is 100 μm or less, it becomes easy for the component [A] to be present in such a manner to cross the boundary between the resin area (B') and the fiber-reinforced plastic area (E) and/or the boundary between the resin area (C') and the fiber-reinforced plastic area (E), and the adhesion force improvement effect is likely to be obtained. In addition, not only chemical or/and physical bonding force but also mechanical bonding force of entanglement is applied, and thus the resin area (B') and the fiber-reinforced plastic area (E) and/or the resin area (C') and the fiber-reinforced plastic area (E) are less likely to separate from each other. The lower limit value of the roughness average length RSm is not particularly limited, and is preferably 15 μm or more from the viewpoint of avoiding a decrease in mechanical bonding force due to stress concentration. When the roughness average height Rc of the cross-section curve is 3.5 μm or more, the mechanical bonding force due to entanglement increases, and it becomes easy for the component [A] to be present in such a manner to cross the boundary between the resin area (B') and the fiber-reinforced plastic area (E) and/or the boundary between the resin area (C') and the fiber-reinforced plastic area (D), and the adhesion force between the resin area (B') and the fiber-reinforced plastic area (E) and/or the adhesion force between the resin area (C') and the fiber-reinforced plastic area (E) improves, which is preferable. The roughness average height Rc of the cross-section curve is more preferably 10 μm or more, and particularly preferably 20 μm because the component [A] is easily included in both resin areas and the adhesion force further improves. The upper limit value is not particularly limited, and is preferably 100 μm or less from the viewpoint of avoiding a decrease in mechanical bonding force due to stress concentration.

Here, as a method of measuring the roughness average height Rc and the roughness average length RSm of the cross-section curve, a known method may be used. Examples thereof include a method of measuring them from a cross-sectional image acquired using X-ray CT, a method of measuring them from an elemental analysis mapping image by an energy dispersive X-ray spectrometer (EDS), and a method of measuring them from a cross-sectional observation image by an optical microscope, a scanning electron microscope (SEM), or a transmission electron microscope (TEM). In the observation, the component [B'] and/or the component [C'] may be stained to adjust the contrast. In the image obtained by any of the above methods, the roughness average height Rc and the roughness average length RSm of the cross-section curve are measured in the range of 500 μm square.

Figure 17:
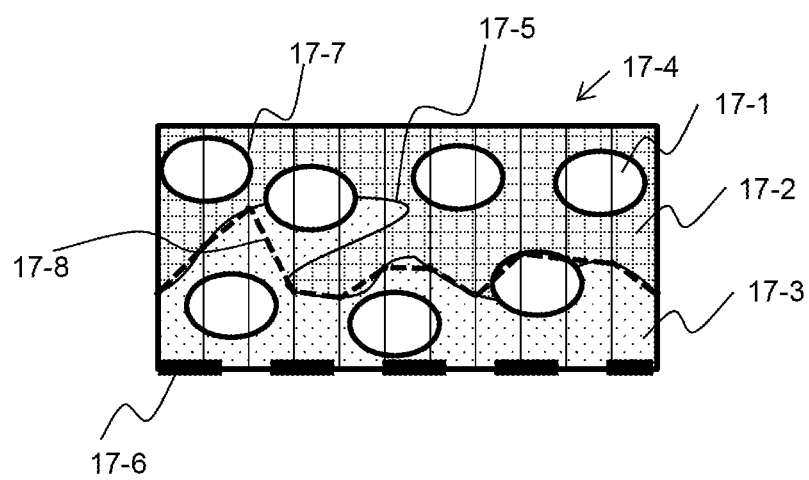
FIG. 17 is a schematic view of an observation cross section of the fiber-reinforced plastic substrate according to the second aspect of the present invention.

One example of a method of measuring the roughness average height Rc and the roughness average length RSm of the cross-section curve is shown with FIG. 17. In the observation image 17-4 of the cross section shown in FIG. 17, the resin area (B')17-2 is in close contact with the fiber-reinforced plastic area (E)17-3, and is illustrated as a boundary 17-5 between the resin area (B') and the fiber-reinforced plastic area (E) in the observation image 17-4. A plurality of components [A]17-1 are present on the boundary 17-5.

One example of a method of measuring the roughness average height Rc and the roughness average length RSm of the cross-section curve (a cross-section curve element measurement method 2) is shown. Vertical base lines 17-7 are drawn at an interval of 5 μm from the fiber-reinforced plastic area (E)17-3 toward the resin area (B')17-2 with an end portion 17-6 on the fiber-reinforced plastic area (E) side of the rectangular observation image 17-4 as a reference line. A point at which the vertical base line drawn from the reference line intersects the component [B'] for the first time is plotted, and a line connecting the plotted points is defined as a cross-section curve 17-8. Filtering processing based on JIS B0601(2001) is performed on the obtained cross-section curve 17-8, and the roughness average height Rc and the roughness average length RSm of the cross-section curve 17-8 are calculated.

The fiber-reinforced plastic substrate of the present invention preferably has a mass of the component [A] per unit area of 30 to 2,000 $g/m^2$. When the mass of the component [A] per unit area is 30 $g/m^2$ or more, an integrated molded article having small deformation in the welding step of fiber reinforced composite material molding is likely to be obtained. When the mass of the component [A] per unit area is 2,000 $g/m^2$ or less, the drapability of the prepreg is likely to improve, and the fiber-reinforced plastic substrate is excellent in moldability into various shapes before curing.

In the fiber-reinforced plastic substrate of the present invention, the mass of the thermosetting resin (d) per unit area is preferably 3 to 4,500 $g/m^2$, more preferably 30 to 2,000 $g/m^2$, and further preferably 50 to 500 $g/m^2$. The range may be a combination of any of the upper limits and any of the lower limits shown above. By setting the mass of the thermosetting resin (d) per unit area within such a range, the amount of the thermosetting resin (d) does not excessively increase, the advantage of the fiber-reinforced plastic area (E) excellent in specific strength and specific elastic modulus is likely to be obtained, and the calorific value during curing hardly excessively increase during molding.

When the fiber-reinforced plastic area (E) has tackiness, the fiber-reinforced plastic areas (E) are stuck to each other at the time of lamination, and thus the orientation direction of the reinforcing fibers hardly shift at the time of further laminating the resin area (B') and the resin area (C'), and an integrated molded article having excellent mechanical properties can be obtained. When the thermosetting resin (d) in the fiber-reinforced plastic area (E) is not present in the fiber-reinforced plastic substrate, it is difficult to maintain the orientation direction of the reinforcing fibers during welding, and an integrated molded article having excellent mechanical properties cannot be obtained.

The fiber-reinforced plastic substrate in the present invention may be formed into an integrated molded article by joining and integrating a resin part (F) to the surface of the resin area (B').

Here, the resin part (F) is preferably made of a thermoplastic resin, and more preferably includes the same kind of resin as the thermoplastic resin (b') from the viewpoint of weldability with the resin area (B'). Furthermore, from the viewpoint of weldability, the absolute value of the difference between the SP value of the resin part (F) and the SP value of the thermoplastic resin (b') is preferably 2 $(MPa)^{1/2}$ or less, and more preferably 1 $(MPa)^{1/2}$ or less.

The resin part (F) may appropriately contain another filler or additive within a range not impairing the object of the present invention depending on the application and the like. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

The resin area (B') in the present invention may be integrated (welded) with the resin part (F) by some heating means. The integration method is not particularly limited, and examples thereof include thermal welding, vibration welding, ultrasonic welding, laser welding, insert injection molding, and outsert injection molding. In particular, injection molding such as insert injection molding or outsert injection molding is preferably used because it is high speed and excellent in productivity.

Furthermore, in the integrated molded article, the proportion of the joining area between the resin area (B') and the resin part (F) is preferably in the range of 5% or more and less than 50% when the surface area of the resin area (B') on the surface of the fiber-reinforced plastic substrate is 100%. The proportion is further preferably 20% or more and 40% or less. The range may be a combination of any of the upper limits and any of the lower limits shown above. By having the proportion within this range, both the mechanical properties of the integrated molded article and the degree of freedom in shape of the resin part (F) can be achieved, and an integrated molded article excellent in mechanical properties and having a high degree of freedom in shape can be easily obtained, which is preferable.

Examples of the form of the resin part (F) include a rib, a boss, a rising wall, and the like, and in particular, it is preferable to join a rib structure to the fiber-reinforced plastic substrate from the viewpoint of achieving both the lightness and mechanical properties of the integrated molded article. Examples of such a rib structure include linear arrangement on the fiber-reinforced plastic substrate and arrangement as crossed cross ribs.

Figure 10:
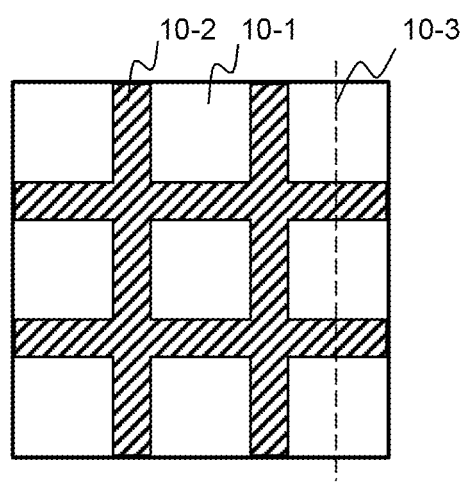
FIG. 10 is a schematic view of an integrated molded article according to the second aspect of the present invention in which the resin area (B') and a resin part (F) are joined.
Figure 11:
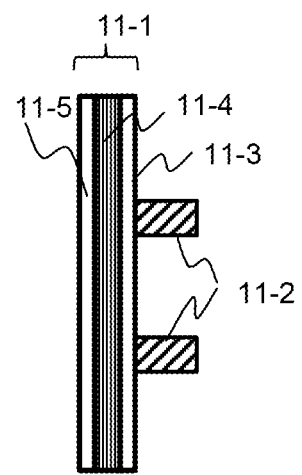
FIG. 11 is a schematic cross-sectional view of the integrated molded article according to the second aspect of the present invention in which the resin area (B') and the resin part (F) are joined.

In injection molding, the injected molten resin part (F) comes into contact with the resin area (B') of the fiber-reinforced plastic substrate inserted into a mold at a high speed, and is cooled and solidified while being applied with pressure. FIG. 10 shows a plan view of an example in which two resin parts (F) are welded to the resin area (B') surface of the fiber-reinforced plastic substrate in the shape of ribs (cross ribs) crossing each other. FIG. 11 is a schematic view of one cross section thereof.

Figure 12:
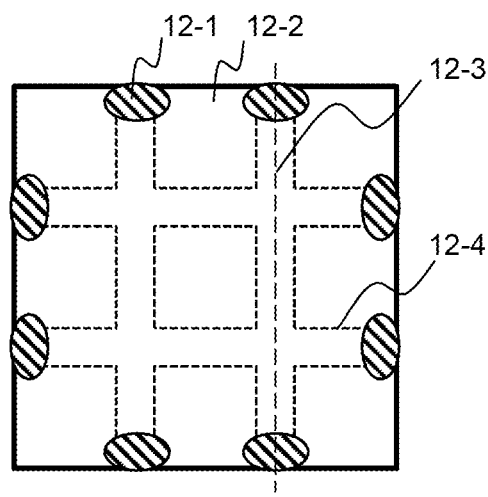
FIG. 12 is a schematic view of one example when a part of the resin part (F) has come around the resin part (C') side in the integrated molded article according to the second aspect of the present invention in which the resin area (B') and the resin part (F) are joined.
Figure 13:
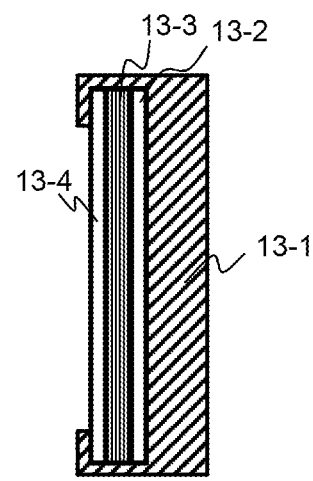
FIG. 13 is a schematic view of a cross section of the integrated molded article according to the second aspect of the present invention in which the resin area (B') and the resin part (F) are joined, in which a part of the resin part (F) has come around the resin area (C') side.

In the case of obtaining such an integrated molded article, as illustrated in FIG. 12 and FIG. 13 which is a cross section thereof, a part of the resin part (F) may come around the resin area (C') side in a molten state. Such a problem is likely to occur particularly when molding is performed at a high temperature and a high pressure for the purpose of improving productivity. To further improve the productivity, it is preferable that an unnecessary portion of the resin part (F) that has come around the resin area (C') side can be easily removed. In the present invention, as described above, by the difference between SPb and SPc satisfying the relationship of the formula (3), even when unintended adhesion occurs, for example, a part of the welding target material to be welded to the resin area (B') comes around the resin area (C') side, the welding is not performed with the resin area (C'), and unnecessary portions can be easily removed.

The fiber-reinforced plastic substrate in the present invention may be formed into an integrated molded article by joining and integrating the resin part (G) to the surface of the resin area (C').

Here, the resin part (G) is preferably made of a thermoplastic resin, and more preferably includes the same kind of resin as the thermoplastic resin (c') from the viewpoint of weldability with the resin area (C'). Furthermore, from the viewpoint of weldability, the absolute value of the difference between the SP value of the resin part (G) and the SP value of the thermoplastic resin (c') is preferably 2 $(MPa)^{1/2}$ or less, and more preferably 1 $(MPa)^{1/2}$ or less.

Furthermore, the resin part (G) may appropriately contain another filler or additive within a range not impairing the object of the present invention depending on the application and the like. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

The resin area (C') in the present invention may be integrated (welded) with the resin part (G) by some heating means. The integration method is not particularly limited, and examples thereof include thermal welding, vibration welding, ultrasonic welding, laser welding, insert injection molding, and outsert injection molding. In particular, injection molding such as insert injection molding or outsert injection molding is preferably used because it is high speed and excellent in productivity.

Furthermore, in the integrated molded article, the proportion of the joining area between the resin area (C') and the resin part (G) is preferably in the range of 5% or more and less than 50% when the surface area of the resin area (C') on the surface of the fiber-reinforced plastic substrate is 100%. The proportion is further preferably 20% or more and 40% or less. The range may be a combination of any of the upper limits and any of the lower limits shown above. By having the proportion within this range, both the mechanical properties of the integrated molded article and the degree of freedom in shape of the resin part (G) can be achieved, and an integrated molded article excellent in mechanical properties and having a high degree of freedom in shape can be easily obtained, which is preferable.

Examples of the form of the resin part (G) include a rib, a boss, a rising wall, and the like, and in particular, it is preferable to join a rib structure to the fiber-reinforced plastic substrate from the viewpoint of achieving both the lightness and mechanical properties of the integrated molded article. Examples of such a rib structure include linear arrangement on the fiber-reinforced plastic substrate and arrangement as crossed cross ribs.

Figure 14:
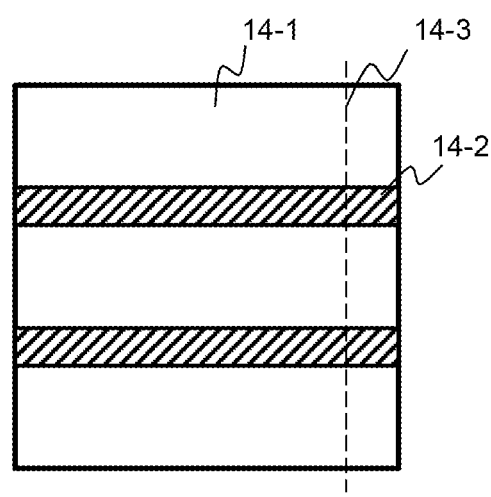
FIG. 14 is a schematic view of an integrated molded article according to the second aspect of the present invention in which the resin area (C') and a resin part (G) are joined.
Figure 15:
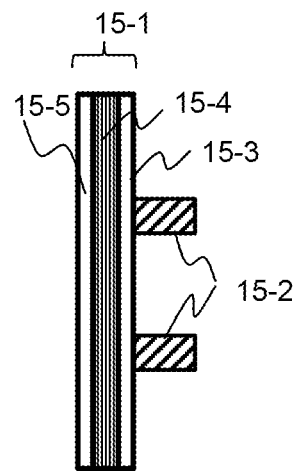
FIG. 15 is a schematic view of a cross section of the integrated molded article according to the second aspect of the present invention in which the resin area (C') and the resin part (G) are joined.

In injection molding, the injected molten resin part (G) comes into contact with the resin area (C') of the fiber-reinforced plastic substrate inserted into a mold at a high speed, and is cooled and solidified while being applied with pressure. FIG. 14 shows a plan view of an example in which two resin parts (G) are welded to the resin area (C') surface of the fiber-reinforced plastic substrate in the shape of ribs parallel to each other. FIG. 15 is a schematic view of one cross section thereof.

Figure 16:
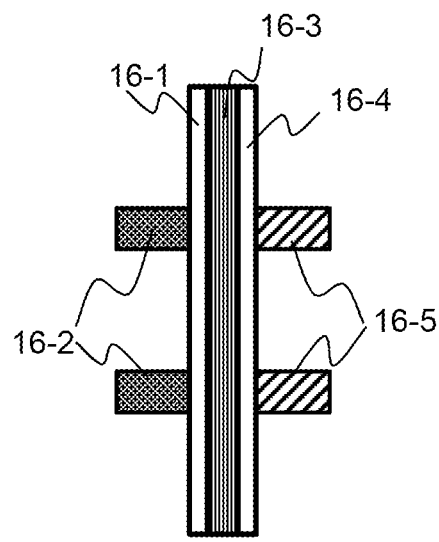
FIG. 16 is a schematic view of a cross section of one example of the integrated molded article according to the second aspect of the present invention in which the resin area (B') and the resin part (F) are joined, and the resin area (C') and the resin part (G) are joined.

In the integrated molded article of the present invention, the resin part (F) may be joined to the surface of the resin area (B') of the fiber-reinforced plastic substrate, and the resin part (G) may be further joined to the surface of the resin area (C') to be integrated. FIG. 16 is a schematic cross-sectional view of the integrated molded article in which the integrated molded article obtained in FIG. 10 is inserted into a mold and the resin part (G) is welded to the resin area (C') in the same manner as in FIG. 14. As shown in FIG. 16, simple welding with a plurality of resin parts is possible, and thus the degree of freedom in shape design is excellent, and for example, even when the shape of the fiber-reinforced plastic substrate changes in one welding step, it can be corrected in the other welding step, which is preferable.

The integrated molded article according to the second aspect of the present invention is preferably used for aircraft structural members, wind turbine blades, automobile external plates, computer applications such as IC trays and housings of notebook computers, and further, for sports applications such as golf shafts and tennis rackets.

EXAMPLES

Hereinafter, the first aspect of the present invention will be described in detail with reference to Examples. However, the scope of the present invention is not limited to these Examples. The unit "part" of the composition ratio means part by mass unless otherwise noted. Measurement of various properties was performed under an environment of a temperature of 23° C. and a relative humidity of 50% unless otherwise noted.

(1) Productivity

From the take-up speed, the number of ruptures of the component [A], the number of processes, and the like at the time of production, the producible quantity per unit time was comprehensively determined, and relative evaluated in four grades of A (particularly good), B (good), C (normal), and D (poor).

(2) Roughness Average Length RSm and Roughness Average Height Rc

Measurement was performed using the fiber-reinforced plastic substrate prepared as shown above. The fiber-reinforced plastic substrate was cut perpendicularly to the planar direction at an angle of 45 degrees in a plan view of the fiber-reinforced plastic substrate with respect to the fiber direction of any reinforcing fiber selected from the component [A] included in the fiber-reinforced plastic substrate to obtain a cross section. For the section, an image was taken at 1000-fold magnification using an optical microscope. In an any observation range of 500 μm square in the obtained image, the roughness average length RSm and the roughness average height Rc defined in JIS B0601(2001) of the cross-section curve element obtained by the cross-section curve element measurement method 2 were measured.

(3) Joining Strength of Fiber-Reinforced Plastic Substrate (Joining Strength Between Component [B] and Component [C])

Figure 7:
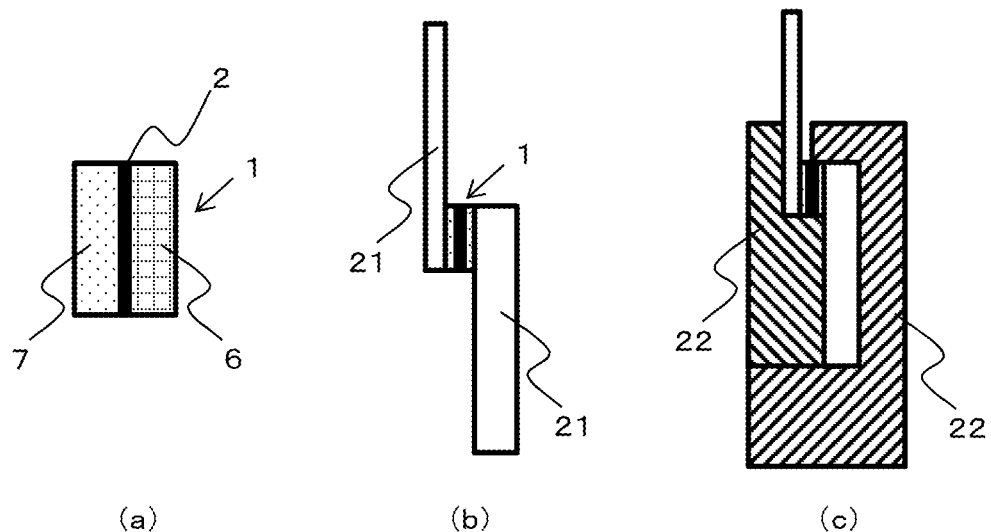
FIG. 7 is a schematic view of a method for producing a joining strength test piece of the fiber-reinforced plastic substrate according to the first aspect of the present invention.

As shown in FIG. 7, a metal member was bonded to both surfaces of the fiber-reinforced plastic substrate using an adhesive to prepare an overlapping test piece (type B) described in ISO19095. Using the obtained test piece, "Instron®" model 5565 universal material testing machine (manufactured by Instron Japan Co., Ltd.), and a test piece holder, the joining strength of the fiber-reinforced plastic substrate was evaluated according to the standard of ISO19095(2015). The joining strength was evaluated as follows.

No less than 15 MPa: A
No less than 10 MPa and less than 15 MPa: B
No less than 5 MPa and less than 10 MPa: C
Less than 5 MPa: D.

(4) Impregnation Rate

For the fiber-reinforced plastic substrate, a cross-sectional image at 500-fold magnification was taken using an optical microscope in a cross section orthogonal to the fiber direction of the component [A], and the impregnation rate was measured on the basis of the formula (6).

(5) Appearance

The disarray of the reinforcing fibers of the obtained fiber-reinforced plastic substrate was visually determined. The disarray was evaluated in three grades wherein a case where there was no disarray in the reinforcing fibers almost parallel to the flow direction from the drawing step to the take-up step was evaluated as A (good), a case where there was slight disarray such as bending was evaluated as B (small fiber disarray), and a case where there was large disarray such as wavy fiber meandering was evaluated as C (large fiber disarray).

(6) Materials and Tools Used

[Carbon Fiber (1)]

Using a copolymer containing polyacrylonitrile as a main component, spinning, a firing treatment, and a surface oxidation treatment were performed to obtain a continuous carbon fiber having a total number of monofilaments of 12,000. The properties of the continuous carbon fiber were as follows.

Single fiber diameter: 7 μm
Density: 1.8 g/cm$^3$
Tensile strength: 4600 MPa
Tensile elastic modulus: 220 GPa

[Glass Fiber (1)]

A continuous E-glass fiber having a total number of monofilaments of 1,600 subjected to a bundling treatment was used. The properties of this continuous E-glass fiber were as follows.

Single fiber diameter: 13 μm
Tensile strength: 3400 MPa
Tensile elastic modulus: 72 GPa
Tensile elongation: 3%
Density: 2.6 g/cm$^3$.

[Reinforcing Fiber Mat (1)]

The carbon fiber (1) was cut into 5 mm with a cartridge cutter to obtain a chopped carbon fiber. A dispersion liquid made of water and a surfactant (Polyoxyethylene Lauryl Ether (product name) manufactured by NACALAI TESQUE, INC.) and having a concentration of 0.1 mass % was prepared, and a reinforcing fiber mat (1) was produced from the dispersion liquid and the chopped carbon fiber using a manufacturing apparatus of a reinforcing fiber mat. The manufacturing apparatus is provided with a cylindrical container as a dispersion tank having a diameter of 1000 mm and having an opening cock at a lower part of the container, and a linear transportation unit (inclination angle: 30°) that connects the dispersion tank and a papermaking tank. An agitator is attached to an opening portion on an upper surface of the dispersion tank, and the chopped carbon fiber and the dispersion liquid (dispersion medium) can be charged from the opening portion. The papermaking tank is a tank provided with a mesh conveyor having a papermaking surface of 500 mm in width at the bottom, and the conveyor capable of conveying a carbon fiber substrate (papermaking substrate) is connected to the mesh conveyor. Papermaking was performed with a carbon fiber concentration in the dispersion of 0.05 mass %. The carbon fiber substrate subjected to papermaking was dried in a drying furnace at 200° C. for 30 minutes to obtain the reinforcing fiber mat (1). The basis weight of the obtained mat was 100 g/m$^2$.

[PA6 Resin, PA6 Resin Film]

As PA6 resin, "AMILAN®" CM1001 (manufactured by Toray Industries, Inc.) was used. Using the PA6 resin, a film (melting point: 225° C.) having a basis weight of 100 g/m$^2$ was produced.

[PP Resin, PP Resin Film]

A resin made of 80 mass % of an unmodified polypropylene resin ("Prime Polypro®" J105G manufactured by Prime Polymer Co., Ltd.) and 20 mass % of an acid-modified polypropylene resin ("ADMER" QB510 manufactured by Mitsui Chemicals, Inc.) was used. Using the PP resin, a film (melting point: 165° C.) having a basis weight of 100 g/m$^2$ was produced.

[PPS Resin, PPS Resin Film]

As PPS resin, a crystalline polyarylene sulfide having a melting point of 280° C. was used. Using the PPS resin, a film having a basis weight of 100 g/m² was produced.

[PEKK Resin, PEKK Resin Film]

As PEKK resin, a polyetherketoneketone resin having a melting point of 300° C. was used. Using the PEKK resin, a film having a basis weight of 100 g/m² was produced.

[PEEK Resin, PEEK Resin Film]

As PEEK resin, a polyether ether ketone resin having a melting point of 343° C. was used. Using the PEEK resin, a film having a basis weight of 100 g/m² was produced.

[PA6 Injection Resin]

As PA6 injection resin, "AMILAN®" CM1011G-45 (manufactured by Toray Industries, Inc.) was used.

[PP Injection Resin]

The carbon fiber (1) and the PP resin described above were compounded using a twin-screw extruder (TEX-30α manufactured by The Japan Steel Works, Ltd.) to produce pellets for injection molding having a fiber content of 30 mass %.

(7) Production Step

[Drawing Step-1]

The carbon fiber (1) or the glass fiber (1) was pulled out from a bobbin, and continuously pulled out as a continuous reinforcing fiber sheet arranged in one direction in a sheet shape such that the fiber mass per unit area was 100 g/m² and the width was 20 mm.

[Drawing Step-2]

The reinforcing fiber mat (1) trimmed into a sheet shape having a fiber mass per unit area of 100 g/m² and a width of 20 mm was continuously drawn out with the conveyor traveling direction at the time of producing the reinforcing fiber mat (1) as the 0° direction.

[First Impregnating Step-1]

A resin film described in Table 1 or 2 as the component [B] was disposed on one surface of the continuous reinforcing fiber sheet continuously drawn out in the drawing step, and heated with an IR heater to melt the component [B], whereby the resin film was attached to the entire surface of one surface of the continuous reinforcing fiber sheet. The obtained material was pressurized with nip rolls set at a surface temperature of the melting point of the component [B]–100° C. to impregnate the continuous reinforcing fiber sheet with the component [B], and cooled, whereby a fiber-reinforced plastic intermediate was obtained.

[First Impregnating Step-2]

The resin film described in Table 1 as the component [B] was disposed on a first surface of the continuous reinforcing fiber sheet continuously drawn out in the drawing step, and the resin film described in Table 1 as the component [C] was disposed on a second surface, then the continuous reinforcing fiber sheet was sandwiched between the two resin films. These were heated with an IR heater to melt or soften the component [B] and the component [C] while causing the continuous reinforcing fiber sheet to travel, and the component [B] and the component [C] were attached to the continuous reinforcing fiber sheet, and pressurized with a nip roll set at a surface temperature of 100° C. lower than a temperature of either the melting point or the glass transition temperature of the component [B] or the component [C] showing a lower value, so that the continuous reinforcing fiber sheet was impregnated with the component [B] and the component [C], and cooled to obtain a fiber-reinforced plastic substrate.

[Second Impregnating Step-1]

A resin film described in Table 1 or 2 as the component [C] was disposed on a second surface of the fiber-reinforced plastic intermediate in which the component [B] was impregnated into the first surface of the continuous reinforcing fiber sheet obtained in the first impregnating step-1. These were heated with an IR heater to melt or soften the component [C], and attached to the second surface of the traveling continuous reinforcing fiber sheet. The continuous reinforcing fiber sheet was impregnated with the component [C] by pressurization with nip rolls set at a surface temperature of 100° C. lower than a temperature of either the melting point or the glass transition temperature of the component [C] showing a lower value, and cooled to obtain a fiber-reinforced plastic substrate.

[Take-Up Step-1]

The fiber-reinforced plastic substrate obtained in the above step was wound with a drum winder.

[Take-Up Step-2]

The fiber-reinforced plastic substrate obtained in the above step was cut every 1 m in length.

In the configuration of the fiber-reinforced plastic substrate in the tables, for example [B]/[A]/[C] indicates that the component [B], the component [A], and the component [C] are laminated in this order, in which the component [B] is present on one surface of the fiber-reinforced plastic substrate, and the component [C] is present on the other surface of the fiber-reinforced plastic substrate. In the configuration of the fiber-reinforced plastic substrate obtained in each Example, the resin area including the component [B] and the resin area including the component [C] were each formed in a layer and adjacent to each other to form a boundary.

Example 1

A fiber-reinforced plastic substrate was produced from the components [A], [B] and [C] described in Table 1 as materials, using a roll-to-roll continuous production apparatus at a speed of 5.0 m/min by the steps described in Table 1 as the production step. The properties of the obtained fiber-reinforced plastic substrate are shown in Table 1.

Example 2

A fiber-reinforced plastic substrate was produced in the same manner as in Example 1 except that the PPS resin was used as the component [B] and the PA6 resin was used as the component [C], and various molding temperatures were changed according to the values of Tb and Tc described in Table 1 according to the resins to be used. The properties of the obtained fiber-reinforced plastic substrate are shown in Table 1.

Example 3

A fiber-reinforced plastic substrate was produced in the same manner as in Example 1 except that a PEKK resin was used as the component [B] and a PA6 resin was used as the component [C], and various molding temperatures were changed according to the values of Tb and Tc described in Table 1 according to the resins to be used. The properties of the obtained fiber-reinforced plastic substrate are shown in Table 1.

Example 4

A fiber-reinforced plastic substrate was produced in the same manner as in Example 1 except that the PPS resin was used as the component [B], and various molding temperatures were changed according to the values of Tb and Tc described in Table 1 according to the resins to be used. The properties of the obtained fiber-reinforced plastic substrate are shown in Table 1.

Example 5

A fiber-reinforced plastic substrate was produced in the same manner as in Example 1 except that the PEEK resin was used as the component [B] and the PA6 resin was used as the component [C], and various molding temperatures were changed according to the values of Tb and Tc described in Table 1 according to the resins to be used. The properties of the obtained fiber-reinforced plastic substrate are shown in Table 1.

Example 6

A fiber-reinforced plastic substrate was produced in the same manner as in Example 1 except that the PEEK resin was used as the component [B], and various molding temperatures were changed according to the values of Tb and Tc described in Table 1 according to the resins to be used. The properties of the obtained fiber-reinforced plastic substrate are shown in Table 2.

Example 7

A fiber-reinforced plastic substrate was produced in the same manner as in Example 1 except that a fiber-reinforced plastic substrate was obtained only by the first impregnating step-2 in which the component [B] and the component [C] were simultaneously impregnated. The properties of the obtained fiber-reinforced plastic substrate are shown in Table 2.

Example 8

A fiber-reinforced plastic substrate was produced in the same manner as in Example 1 except that three layers of the component [A] were used and the configuration of the fiber-reinforced plastic substrate was changed to [B]/[A]/[B]/[A]/[C]/[A]/[C]. The properties of the obtained fiber-reinforced plastic substrate are shown in Table 2.

Example 9

A fiber-reinforced plastic substrate was produced in the same manner as in Example 1 except that the glass fiber was used as the component [A]. The properties of the obtained fiber-reinforced plastic substrate are shown in Table 2.

Reference Example 1

The fiber-reinforced plastic substrate obtained in Example 1 was cut out and placed between injection molding molds. The molds were closed, and two-color molding was performed using two types of injection materials such that the PA6 injection resin was on the component [B] side and the PP injection resin was on the component [C] side. As a result, an integrated molded article was obtained in which another member made of PA6 was joined via the component [B], and another member made of PP was joined via the component [C].

Comparative Example 1

A non-reinforced resin substrate was produced in the same manner as in Example 7 except that the component [A] was not used. The properties of the obtained non-reinforced resin substrate are shown in Table 3.

Comparative Example 2

A fiber-reinforced plastic substrate was produced in the same manner as in Example 1 except that the reinforcing fiber mat was used as the component [A] (the form of carbon fibers was random). The properties of the obtained fiber-reinforced plastic substrate are shown in Table 3.

Comparative Example 3

The same materials as in Example 1 were prepared. A fiber-reinforced plastic (I) made of the components [A] and [B] was obtained in the same manner as in Example 1 except that the component [B] was disposed on the second surface in the first impregnating step-2 (both surfaces of the continuous reinforcing fiber sheet have the component [B]). Separately from this, a fiber-reinforced plastic (II) made of the components [A] and [C] was obtained in the same manner as in Example 1 except that the component [C] was disposed on the first surface in the first impregnating step-1 (both surfaces of the continuous reinforcing fiber sheet have the component [C]). A product in which the obtained fiber-reinforced plastic (I) and the fiber-reinforced plastic layer (II) were layered was heated with an IR heater to a temperature at which only the component [C] melts and caused to travel, and at the same time pressurized with a nip roll set at a surface temperature of 100° C. lower than the melting point of the component [C] to be welded, whereby a fiber-reinforced plastic substrate was obtained.

Reference Example 2

A fiber-reinforced plastic substrate was produced in the same manner as in Example 7 except that the PP resin was used for both the constituent the component [B] and the component [C]. The properties of the obtained fiber-reinforced resin are shown in Table 3. The obtained fiber-reinforced plastic substrate was cut out and placed between injection molding molds in the same manner as in Reference Example 1. The molds were closed, and two-color molding was performed using two types of injection materials such that a PA6 injection resin was on one surface side and a PP injection resin was on the other surface side. At this time, the PA6 injection resin was not welded to the fiber-reinforced resin and peeled off.

TABLE 1-1

| | Unit | Example 1 | Example 2 | Example 3 |
|---|---|---|---|---|
| Component [A]: reinforcing fiber | | | | |
| Type | — | carbon fiber | carbon fiber | carbon fiber |
| Form | — | one direction | one direction | one direction |
| Basis weight | gsm | 100 | 100 | 100 |
| Content rate | mass % | 33.3 | 33.3 | 33.3 |
| Component [B]: thermoplastic resin (b) | | | | |
| Type | — | PA6 | PPS | PEKK |
| Tb | ° C. | 265 | 280 | 305 |
| δDB | — | 18.4 | 23 | 21.7 |

TABLE 1-1-continued

|  | Unit | Example 1 | Example 2 | Example 3 |
|---|---|---|---|---|
| δPB | — | 13 | 6.4 | 9.8 |
| δHC | — | 9.6 | 5 | 5 |
| Content rate | mass % | 33.3 | 33.3 | 33.3 |
| Component [C]: thermoplastic resin (c) | | | | |
| Type | — | PP | PA6 | PA6 |
| Tc | ° C. | 165 | 225 | 225 |
| δDC | — | 16.2 | 18.4 | 18.4 |
| δPC | — | 0.1 | 13 | 13 |
| δHC | — | 0.1 | 9.6 | 9.6 |
| Content rate | mass % | 33.3 | 33.3 | 33.3 |
| Fiber-reinforced plastic substrate | | | | |
| Configuration | — | [B]/[A]/[C] | [B]/[A]/[C] | [B]/[A]/[C] |
| Drawing step | — | drawing step-1 | drawing step-1 | drawing step-1 |
| First impregnating step | — | first impregnating step-1 | first impregnating step-1 | first impregnating step-1 |
| Second impregnating step | — | second impregnating step-1 | second impregnating step-1 | second impregnating step-1 |
| Take-up step | — | take-up step-1 | take-up step-1 | take-up step-1 |
| Reinforcing fiber present across boundary | — | present | present | present |
| State and arrangement of resin area | — | layered/adjacent | layered/adjacent | layered/adjacent |
| Ra$_{(bc)}$ | — | 16.6 | 12.2 | 8.7 |
| RSm | μm | 47 | 41 | 39 |
| Rc | μm | 23 | 15 | 13 |
| Impregnation rate | % | 98 | 99 | 99 |
| Thickness | mm | 0.26 | 0.22 | 0.24 |
| ΔT: |Tb − Tc| | ° C. | 100 | 55 | 80 |
| Method | — | impregnation in separate step | impregnation in separate step | impregnation in separate step |
| Joining strength | — | A | A | A |
| Productivity | — | A | A | A |
| Appearance | — | A | A | A |

TABLE 1-2

|  | Unit | Example 4 | Example 5 |
|---|---|---|---|
| Component [A]: reinforcing fiber | | | |
| Type | — | carbon fiber | carbon fiber |
| Form | — | one direction | one direction |
| Basis weight | gsm | 100 | 100 |
| Content rate | mass % | 33.3 | 33.3 |
| Component [B]: thermoplastic resin (b) | | | |
| Type | — | PPS | PEEK |
| Tb | ° C. | 280 | 343 |
| δDB | — | 23 | 21.5 |
| δPB | — | 6.4 | 8.4 |
| δHC | — | 5 | 5.7 |
| Content rate | mass % | 33.3 | 33.3 |
| Component [C]: thermoplastic resin (c) | | | |
| Type | — | PP | PA6 |
| Tc | ° C. | 165 | 225 |
| δDC | — | 16.2 | 18.4 |
| δPC | — | 0.1 | 13 |
| δHC | — | 0.1 | 9.6 |
| Content rate | mass % | 33.3 | 33.3 |

TABLE 1-2-continued

|  | Unit | Example 4 | Example 5 |
|---|---|---|---|
| Fiber-reinforced plastic substrate | | | |
| Configuration | — | [B]/[A]/[C] | [B]/[A]/[C] |
| Drawing step | — | drawing step-1 | drawing step-1 |
| First impregnating step | — | first impregnating step-1 | first impregnating step-1 |
| Second impregnating step | — | second impregnating step-1 | second impregnating step-1 |
| Take-up step | — | take-up step-1 | take-up step-1 |
| Reinforcing fiber present across boundary | — | present | present |
| State and arrangement of resin area | — | layered/adjacent | layered/adjacent |
| Ra$_{(bc)}$ | — | 15.8 | 8.6 |
| RSm | μm | 41 | 42 |
| Rc | μm | 15 | 16 |
| Impregnation rate | % | 99 | 99 |
| Thickness | mm | 0.24 | 0.22 |
| ΔT: |Tb − Tc| | ° C. | 115 | 118 |
| Method | — | impregnation in separate step | impregnation in separate step |
| Joining strength | — | A | A |
| Productivity | — | A | A |
| Appearance | — | A | A |

TABLE 2-1

|  | Unit | Example 6 | Example 7 |
|---|---|---|---|
| Component [A]: reinforcing fiber | | | |
| Type | — | carbon fiber | carbon fiber |
| Form | — | one direction | one direction |
| Basis weight | gsm | 100 | 100 |
| Content rate | mass % | 33.3 | 33.3 |
| Component [B]: thermoplastic resin (b) | | | |
| Type | — | PEEK | PA6 |
| Tb | ° C. | 343 | 225 |
| δDB | — | 21.5 | 18.4 |
| δPB | — | 8.4 | 13 |
| δHC | — | 5.7 | 9.6 |
| Content rate | mass % | 33.3 | 33.3 |
| Component [C]: thermoplastic resin (c) | | | |
| Type | — | PP | PP |
| Tc | ° C. | 165 | 165 |
| δDC | — | 16.2 | 16.2 |
| δPC | — | 0.1 | 0.1 |
| δHC | — | 0.1 | 0.1 |
| Content rate | mass % | 33.3 | 33.3 |
| Fiber-reinforced plastic substrate | | | |
| Configuration | — | [B]/[A]/[C] | [B]/[A]/[C] |
| Drawing step | — | drawing step-1 | drawing step-1 |
| First impregnating step | — | first impregnating step-1 | first impregnating step-2 |
| Second impregnating step | — | second impregnating step-1 | — |
| Take-up step | — | take-up step-1 | take-up step-1 |
| Reinforcing fiber present across boundary | — | present | present |
| State and arrangement of resin area | — | layered/adjacent | layered/adjacent |
| Ra$_{(bc)}$ | — | 14.6 | 16.6 |
| RSm | μm | 42 | 58 |
| Rc | μm | 16 | 12 |

TABLE 2-1-continued

|  | Unit | Example 6 | Example 7 |
|---|---|---|---|
| Impregnation rate | % | 99 | 84 |
| Thickness | mm | 0.24 | 0.28 |
| ΔT: \|Tb − Tc\| | ° C. | 178 | 60 |
| Method | — | impregnation in separate step | impregnation in the same step |
| Joining strength | — | A | B |
| Productivity | — | A | B |
| Appearance | — | A | B |

TABLE 2-2

|  | Unit | Example 8 | Example 9 |
|---|---|---|---|
| Component [A]: reinforcing fiber | | | |
| Type | — | carbon fiber | glass fiber |
| Form | — | one direction | one direction |
| Basis weight | gsm | 300 | 100 |
| Contentrate | mass % | 42.9 | 33.3 |
| Component [B]: thermoplastic resin (b) | | | |
| Type | — | PA6 | PA6 |
| Tb | ° C. | 225 | 265 |
| δDB | — | 18.4 | 18.4 |
| δPB | — | 13 | 13 |
| δHC | — | 9.6 | 9.6 |
| Content rate | mass % | 28.6 | 33.3 |
| Component [C]: thermoplastic resin (c) | | | |
| Type | — | PP | PP |
| Tc | ° C. | 165 | 165 |
| δDC | — | 16.2 | 16.2 |
| δPC | — | 0.1 | 0.1 |
| δHC | — | 0.1 | 0.1 |
| Content rate | mass % | 28.6 | 33.3 |
| Fiber-reinforced plastic substrate | | | |
| Configuration | — | [B]/[A]/[B]/[A]/[C]/[A]/[C] | [B]/[A]/[C] |
| Drawing step | — | drawing step-1 | drawing step-1 |
| First impregnating step | — | first impregnating step-1 | first impregnating step-1 |
| Second impregnating step | — | second impregnating step-1 | second impregnating step-1 |
| Take-up step | — | take-up step-2 | take-up step-1 |
| Reinforcing fiber present across boundary | — | present | present |
| State and arrangement of resin area | — | layered/adjacent | layered/adjacent |
| Ra$_{(bc)}$ | — | 16.6 | 16.6 |
| RSm | μm | 51 | 89 |
| Rc | μm | 17 | 11 |
| Impregnation rate | % | 98 | 98 |
| Thickness | mm | 0.57 | 0.24 |
| ΔT: \|Tb − Tc\| | ° C. | 60 | 100 |
| Method | — | impregnation in separate step | impregnation in separate step |
| Joining strength | — | A | A |
| Productivity | — | B | A |
| Appearance | — | A | A |

TABLE 3-1

|  | Unit | Comparative Example 1 | Comparative Example 2 |
|---|---|---|---|
| Component [A]: reinforcing fiber | | | |
| Type | — | — | carbon fiber |
| Form | — | — | random |
| Basis weight | gsm | — | 100 |
| Content rate | mass % | — | 33.3 |
| Component [B] thermoplastic resin (b) | | | |
| Type | — | PA6 | PA6 |
| Tb | ° C. | 225 | 265 |
| δDB | — | 18.4 | 18.4 |
| δPB | — | 13 | 13 |
| δHC | — | 9.6 | 9.6 |
| Content rate | mass % | 50 | 33.3 |
| Component [C]: thermoplastic resin (c) | | | |
| Type | — | PP | PP |
| Tc | ° C. | 165 | 165 |
| δDC | — | 16.2 | 16.2 |
| δPC | — | 0.1 | 0.1 |
| δHC | — | 0.1 | 0.1 |
| Content rate | mass % | 50 | 33.3 |
| Fiber-reinforced plastic substrate | | | |
| Configuration | — | [B]/[C] | [B]/[A]/[C] |
| Drawing step | — | drawing step-1 | drawing step-2 |
| First impregnating step | — | first impregnating step-2 | first impregnating step-1 |
| Second impregnating step | — | — | second impregnating step-1 |
| Take-up step | — | take-up step-1 | take-up step-1 |
| Reinforcing fiber present across boundary | — | none | present |
| State and arrangement of resin area | — | layered/adjacent | layered/adjacent |
| Ra$_{(bc)}$ | — | 16.6 | 16.6 |
| RSm | μm | — | 113 |
| Rc | μm | — | 31 |
| Impregnation rate | % | — | 98 |
| Thickness | mm | 0.2 | 0.26 |
| ΔT: \|Tb − Tc\| | ° C. | 60 | 100 |
| Method | — | impregnation in the same step | impregnation in separate step |
| Joining strength | — | D | B |
| Productivity | — | D | C |
| Appearance | — | A | A |

TABLE 3-2

|  | Unit | Comparative Example 3 | Reference Example 2 |
|---|---|---|---|
| Component [A]: reinforcing fiber | | | |
| Type | — | carbon fiber | carbon fiber |
| Form | — | one direction | one direction |
| Basis weight | gsm | 100 | 100 |
| Content rate | mass % | 33.3 | 33.3 |
| Component [B]: thermoplastic resin (b) | | | |
| Type | — | PA6 | PP |
| Tb | ° C. | 265 | 165 |
| δDB | — | 18.4 | 16.2 |
| δPB | — | 13 | 0.1 |
| δHC | — | 9.6 | 0.1 |
| Content rate | mass % | 33.3 | 33.3 |
| Component [C]: thermoplastic resin (c) | | | |
| Type | — | PP | PP |
| Tc | ° C. | 165 | 165 |

TABLE 3-2-continued

|  | Unit | Comparative Example 3 | Reference Example 2 |
|---|---|---|---|
| δDC | — | 16.2 | 16.2 |
| δPC | — | 0.1 | 0.1 |
| δHC | — | 0.1 | 0.1 |
| Content rate | mass % | 33.3 | 33.3 |
| Fiber-reinforced plastic substrate | | | |
| Configuration | — | [B]/[A]/[B], [C]/[A]/[C] | [B]/[A]/[C] |
| Drawing step | — | drawing step-1 | drawing step-1 |
| First impregnating step | — | first impregnating step-2 | first impregnating step-2 |
| Second impregnating step | — | first impregnating step-2 | — |
| Take-up step | — | take-up step-1 | take-up step-1 |
| Reinforcing fiber present across boundary | — | none | none |
| State and arrangement of resin area | — | layered/adjacent | layered/single |
| $Ra_{(bc)}$ | — | 16.6 | 0.0 |
| RSm | μm | — | — |
| Rc | μm | — | — |
| Impregnation rate | % | 98 | 98 |
| Thickness | mm | 0.56 | 0.26 |
| ΔT: |Tb − Tc| | ° C. | 100 | 0 |
| Method | — | impregnation in separate step | impregnation in the same step |
| Joining strength | — | D | B |
| Productivity | — | D | C |
| Appearance | — | A | C |

<Review>

Comparison of Examples 1 to 9 and Comparative Examples 1 to 3 showed that the fiber-reinforced plastic substrate obtained according to the present invention was able to compound a combination of resins that generally have very low compatibility and were difficult to be compounded. In particular, in Example 1 and Examples 4 to 6, in the impregnation method (described in Patent Document 2 for example) in which a plurality of resins are simultaneously melted, even in a combination of resins in which a difference in melting point at which one resin is decomposed or glass transition temperature is 100° C. or more, it was possible to compound the resins without decomposing or deteriorating the resins. In Example 8, it was shown that a thick fiber-reinforced plastic substrate was able to be obtained by increasing the use amount of reinforcing fibers. On the other hand, in Comparative Example 1, because the reinforcing fibers as the component [A] were absent, these resins were easily peeled off, and it was impossible to compound these resins. Further, in Comparative Example 2, the reinforcing fibers were torn and intermittently produced in spite of the combination of resins that were able to be continuously wound in Examples. In addition, from the observation of the obtained fiber-reinforced plastic substrate, it was shown that the variation in anchoring depth (such as the roughness average height Rc) was large. In Comparative Example 3, even with the same material configuration as in Example 1, the reinforcing fibers were not present across the boundary between the fiber-reinforced thermoplastic resin (I) and the fiber-reinforced thermoplastic resin (II), and thus each layer was easily peeled off, and an intended substrate was not able to be obtained.

Figure 8:
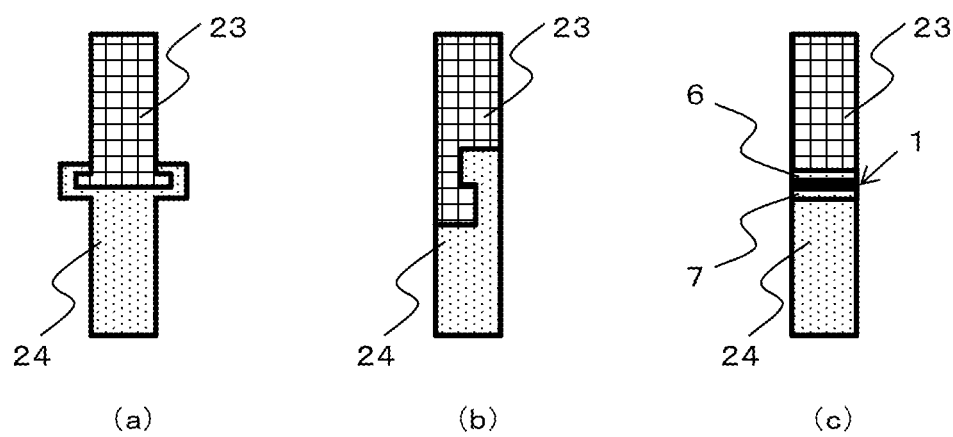
FIG. 8 is a schematic view of an integrated molded article according to the first aspect of the present invention to which members made of different resins are joined.

In Reference Example 1, an integrated molded article in which members made of two different resins as shown in FIG. 8(c) were joined using the fiber-reinforced plastic substrate obtained in Example 1 as a medium was able to be obtained. As shown in Comparative Example 1, this combination of resins is a combination in which peeling easily occurs in conventional techniques, and it has been found that an integrated molded article firmly integrated can be obtained by using the fiber-reinforced plastic substrate of the present invention. In conventional techniques, to secure the joining strength in such a combination of resins, it was necessary to form fitting as shown in FIGS. 8(a) and 8(b'). Using the fiber-reinforced plastic substrate of the present invention eliminates such a need and can increase the degree of freedom in designing the shape and the like. When the same type of resin was used for both surfaces of the fiber-reinforced plastic substrate as in Reference Example 2, members made of different resins as in Reference Example 1 was not able to be joined.

Hereinafter, the second aspect of the present invention will be described in detail with reference to Examples. However, the scope of the present invention is not limited to these Examples. The unit "part" of the composition ratio means part by mass unless otherwise noted. Measurement of various properties was performed under an environment of a temperature of 23° C. and a relative humidity of 50% unless otherwise noted.

<Materials Used in Examples and Comparative Examples>

The following raw materials were used. The configurations used in the respective Examples and Comparative Examples are as shown in Tables 4 to 7.

<Thermoplastic Resin (b') and Thermoplastic Resin (c')>

PA6: polyamide 6 (crystalline polyamide having a melting point of 225 [° C.] and an SP value of 24 $[MPa]^{1/2}$)

PA66: polyamide 66 (crystalline polyamide having a melting point of 267 [° C.] and an SP value of 25 $[MPa]^{1/2}$)

PP: polypropylene (crystalline polyolefin having a melting point of 170 [° C.] and an SP value of 16 $[MPa]^{1/2}$)

PPS: polyarylene sulfide (crystalline thermoplastic resin having a melting point of 284 [° C.] and an SP value of 24 $[MPa]^{1/2}$).

PES: polyethersulfone (amorphous polyethersulfone having a glass transition temperature of 225 [° C.] and an SP value of 24 $[MPa]^{1/2}$)

PEKK: polyetherketoneketone (crystalline polyarylene ether ketone having a melting point of 300 [° C.] and an SP value of 24 $[MPa]^{1/2}$).

<Reinforcing Fiber>

CF-1: carbon fiber ("TORAYCA®" T800S-24K, manufactured by Toray Industries, Inc., strand tensile strength: 5.9 GPa)

CF-2: carbon fiber ("TORAYCA®" T700S-24K, manufactured by Toray Industries, Inc., strand tensile strength: 4.9 GPa).

<Method for Producing Thermosetting Resin (d)>

A thermosetting resin (d) was produced using the following compounds.

(1) Epoxy Resin

Tetraglycidyl diaminodiphenylmethane ("Araldite®" MY721, manufactured by Huntsman Advanced Materials LLC.) epoxy equivalent: 113 (g/eq.), tetrafunctional glycidyl amine epoxy resin)

Bisphenol A epoxy resin ("jER®" 825, manufactured by Mitsubishi Chemical Corporation) epoxy equivalent: 175 (g/eq.))

(2) Amine Compound 4,4'-Diaminodiphenyl sulfone (SEIKACURE S, manufactured by Wakayama Seika Kogyo Co., Ltd.)

(3) Thermoplastic Resin Soluble in Thermosetting Resin
Polyethersulfone ("SINIKAEXCEL®" PES5003P, manufactured by Sumitomo Chemical Co., Ltd.).
(4) Method for Preparing Epoxy Resin D-1 Corresponding to Thermosetting Resin (d)

Into a kneading apparatus, 50 parts of tetraglycidyl diaminodiphenylmethane, 50 parts of a bisphenol A type epoxy resin, and 7.6 parts of polyethersulfone were charged, and heated and kneaded to dissolve the polyethersulfone. Then, the temperature was lowered to 100° C. or less while continuing the kneading, and 45.1 parts of 4,4'-diaminodiphenyl sulfone was added and stirred to obtain an epoxy resin D-1 corresponding to the thermosetting resin (d).

(5) Method for Preparing Epoxy Resin D-2 Corresponding to Thermosetting Resin (d)

Into a kneading apparatus, 70 parts of tetraglycidyl diaminodiphenylmethane, 30 parts of a bisphenol A type epoxy resin, and 7.8 parts of polyethersulfone were charged, and heated and kneaded to dissolve the polyethersulfone. Then, the temperature was lowered to 100° C. or less while continuing the kneading, and 49 parts of 4,4'-diaminodiphenyl sulfone was added and stirred to obtain an epoxy resin D-2 corresponding to the thermosetting resin (d).

<Method for Producing Fiber-Reinforced Plastic Area (E)>

The thermosetting resin (d) was coated on a release paper with a resin basis weight of 50 g/m$^2$ using a knife coater to produce a resin film. The resin film was superimposed on both sides of the reinforcing fibers (basis weight: 193 g/m$^2$) aligned in one direction, and then the carbon fibers were impregnated with the thermosetting resin (d) with a heat roll while being heated and pressurized, whereby a prepreg was obtained.

The prepreg prepared above was cut into a predetermined size, and laminated with $[0°/90°]_{2S}$ (symbol S indicates mirror symmetry), defining the axial direction of the reinforcing fibers as 0° and the axis orthogonal direction as 90°, whereby a fiber-reinforced plastic area (E) was produced.

<Resin Part (F) and Resin Part (G)>
<Method for Producing PA-1>

Into a twin-screw extruder, 80 parts of PA6 and 20 parts of CF-1 were charged, and heated and kneaded at 250° C. to obtain pellets for injection molding (PA-1). The number average fiber length of CF-1 in the pellets was 0.1 mm.

<Method for Producing PP-1>

Into a twin-screw extruder, 80 parts of PP and 20 parts of CF-1 were charged, and heated and kneaded at 190° C. to obtain pellets for injection molding (PP-1). The number average fiber length of CF-1 in the pellets was 0.2 mm.

<Method for Producing PPS-1>

In a twin-screw extruder, 80 parts of PPS and 20 parts of CF-1 were charged, and heated and kneaded at 300° C. to obtain pellets for injection molding (PPS-1). The number average fiber length of CF-1 in the pellets was 0.1 mm.

<Method for Producing PES-1>

In a twin-screw extruder, 80 parts of PES and 20 parts of CF-1 were charged, and heated and kneaded at 250° C. to obtain pellets for injection molding (PES-1). The number average fiber length of CF-1 in the pellets was 0.1 mm.

<Method for Producing PEKK-1>

In a twin-screw extruder, 80 parts of PEKK and 20 parts of CF-1 were charged, and heated and kneaded at 320° C. to obtain pellets for injection molding (PEKK-1). The number average fiber length of CF-1 in the pellets was 0.1 mm.

<Evaluation of Moldability>

To evaluate moldability, an integrated molded article (FB') for evaluation of moldability was obtained by injection-molding the resin part (F) used in each Example only on the resin area (B') surface of the fiber-reinforced plastic substrate. In addition, an integrated molded article (FC') for evaluation of moldability was obtained by changing only the orientation of the fiber-reinforced plastic substrate between the molds, and the resin part (F) was injection-molded only on the resin area (C') surface of the fiber-reinforced plastic substrate. Likewise, for the resin part (G) used in each Example, an integrated molded article for evaluation of moldability (GB') obtained by injection molding only on the resin area (B') surface and an integrated molded article for evaluation of moldability (GC') obtained by injection molding only on the resin area (C') surface were obtained. From each of the obtained integrated molded articles for evaluation of moldability, as a sample for evaluation of vertical joining strength, a sample was cut out to include a portion where the fiber-reinforced plastic substrate and each of the resin part (F) and the resin part (G) were joined to each other and to have a planar shape with an area of the joining portion of 10 mm×10 mm.

For each sample, the fiber-reinforced plastic substrate and the resin part (F) or the resin part (G) were each supported such that a load perpendicular to the in-plane direction of the joining surface was applied, and a tensile test was performed in the peeling direction using "Instron®" model 5565 universal material testing machine (manufactured by Instron Japan Co., Ltd.). In a case where the test machine could not support the test piece, an adhesive (ThreeBond 1782, manufactured by ThreeBond Holdings Co., Ltd.) was applied to the joining surface, and the test piece was supported via a jig which was bonded by being allowed to stand at 23±5° C. and 50±5% RH for 4 hours or more.

The tensile test was performed by pulling the sample in the vertical direction from the joining surface at a tensile speed of 1.27 mm/min, and a value obtained by dividing the maximum load by the adhesion area was taken as the vertical joining strength (unit: MPa). The number of samples was n=5. When a sample was not able to be collected with a joining area of 10 mm×10 mm, the sample was cut out such that the joining area has a maximum area of 100 mm$^2$ or less, and the maximum load at the time of the tensile test was divided by the joining area at this time to obtain the vertical joining strength (unit: MPa).

The vertical joining strength was evaluated in the following four grades, and good and fair were regarded as acceptable.

<Evaluation of Moldability Regarding Resin Part (F)>
good: The joining strength (F/b adhesion, the same applies hereinafter) between the resin part (F) and the resin area (B') is 10 MPa or more, and the joining strength (F/c adhesion, the same applies hereinafter) between the resin part (F) and the resin area (C') is less than 2 MPa.
Fair: The joining strength between the resin part (F) and the resin area (B') is 10 MPa or more, and the joining strength between the resin part (F) and the resin area (C') is 2 MPa or more and less than 5 MPa.
bad-1: The joining strength between the resin part (F) and the resin area (B') is less than 10 MPa.
bad-2: The joining strength between the resin part (F) and the resin area (B') is 10 MPa or more, and the joining strength between the resin part (F) and the resin area (C') is 5 MPa or more.

<Evaluation of Moldability Regarding Resin Part (G)>
good: The joining strength (G/c adhesion, the same applies hereinafter) between the resin part (G) and the resin area (C') is 10 MPa or more, and the joining strength (G/b adhesion, the same applies hereinafter) between the resin part (G) and the resin area (B') is less than 2 MPa.

fair: The joining strength between the resin part (G) and the resin area (C') is 10 MPa or more, and the joining strength between the resin part (G) and the resin area (B') is 2 MPa or more and less than 5 MPa.

bad-3: The joining strength between the resin part (G) and the resin area (C') is less than 10 MPa.

bad-4: The joining strength between the resin part (G) and the resin area (C') is 10 MPa or more, and the joining strength between the resin part (G) and the resin area (B') is 5 MPa or more.

Example 11

Using the materials shown in Table 4, a layered fiber-reinforced plastic areas (E) including the thermosetting resin (d) and the reinforcing fibers was obtained according to <Method for Producing Fiber-Reinforced Plastic Area (E)> described above. On the fiber-reinforced plastic area (E), 50 g/m² of a sheet-like resin area (B') was disposed and welded at 230° C. and 0.5 MPa for 10 seconds. Next, 50 g/m² of a sheet-like resin area (C') was disposed on the surface of the fiber-reinforced plastic area (E) on the side opposite to the resin area (B'), and welded at 200° C. and 0.5 MPa for 10 seconds to obtain a fiber-reinforced plastic substrate in which the resin area (B'), the fiber-reinforced plastic area (E), and the resin area (C') were adjacent to each other in a layered manner in this order. The characteristics of the obtained fiber-reinforced plastic substrate are shown in Table 4.

Example 12

A fiber-reinforced plastic substrate was obtained in the same manner as in Example 11 except that the thermoplastic resin (b') was changed from PA6 to PA66, and the welding temperature of the resin area (B') to the fiber-reinforced plastic area (E) was changed from 230° C. to 270° C. The characteristics of the obtained fiber-reinforced plastic substrate are shown in Table 4.

Example 13

A fiber-reinforced plastic substrate was obtained in the same manner as in Example 11 except that the thermoplastic resin (b') was changed from PA6 to PPS, and the welding temperature of the resin area (B') to the fiber-reinforced plastic area (E) was changed from 230° C. to 290° C. The characteristics of the obtained fiber-reinforced plastic substrate are shown in Table 4.

Example 14

A fiber-reinforced plastic substrate was obtained in the same manner as in Example 11 except that the thermoplastic resin (c') was changed from PP to PES, and the welding temperature of the resin area (C') to the fiber-reinforced plastic area (E) was changed from 200° C. to 230° C. The characteristics of the obtained fiber-reinforced plastic substrate are shown in Table 4.

Example 15

A fiber-reinforced plastic substrate was obtained in the same manner as in Example 14 except that the thermoplastic resin (b') was changed from PA6 to PPS, and the welding temperature of the resin area (B') to the fiber-reinforced plastic area (E) was changed from 230° C. to 290° C. The characteristics of the obtained fiber-reinforced plastic substrate are shown in Table 4.

Example 16

A fiber-reinforced plastic substrate was obtained in the same manner as in Example 14 except that the thermoplastic resin (b') was changed from PA6 to PEKK, and the welding temperature of the resin area (B') to the fiber-reinforced plastic area (E) was changed from 230° C. to 300° C. The characteristics of the obtained fiber-reinforced plastic substrate are shown in Table 4.

Comparative Example 11

A fiber-reinforced plastic substrate was obtained in the same manner as in Example 11 except that the thermoplastic resin (c') was changed from PP to PA6, and the welding temperature of the resin area (C') to the fiber-reinforced plastic area (E) was changed from 200° C. to 230° C. The characteristics of the obtained fiber-reinforced plastic substrate are shown in Table 4.

Comparative Example 12

A fiber-reinforced plastic substrate was obtained in the same manner as in Example 11 except that the thermoplastic resin (c') was changed from PP to PA66, and the welding temperature of the resin area (C') to the fiber-reinforced plastic area (E) was changed from 200° C. to 270° C. The characteristics of the obtained fiber-reinforced plastic substrate are shown in Table 5.

Comparative Example 13

A fiber-reinforced plastic substrate was obtained in the same manner as in Comparative Example 12 except that the thermoplastic resin (b') was changed from PA6 to PA66, and the welding temperature of the resin area (B') to the fiber-reinforced plastic area (E) was changed from 230° C. to 270° C. The characteristics of the obtained fiber-reinforced plastic substrate are shown in Table 5.

Comparative Example 14

A fiber-reinforced plastic substrate was obtained in the same manner as in Example 15 except that the thermoplastic resin (c') was changed from PES to PPS, and the welding temperature of the resin area (C') to the fiber-reinforced plastic area (E) was changed from 230° C. to 290° C. The characteristics of the obtained fiber-reinforced plastic substrate are shown in Table 5.

Comparative Example 15

A fiber-reinforced plastic substrate was obtained in the same manner as in Example 16 except that the thermoplastic resin (c') was changed from PES to PEKK, and the welding temperature of the resin area (C') to the fiber-reinforced plastic area (E) was changed from 230° C. to 300° C. The characteristics of the obtained fiber-reinforced plastic substrate are shown in Table 5.

Example 17

A fiber-reinforced plastic substrate was obtained in the same manner as in Example 11 except that the thermosetting resin (d) was changed from D-1 to D-2. The characteristics of the obtained fiber-reinforced plastic substrate are shown in Table 5.

Example 18

A fiber-reinforced plastic substrate was obtained in the same manner as in Example 11 except that the reinforcing fibers were changed from CF-1 to CF-2. The characteristics of the obtained fiber-reinforced plastic substrate are shown in Table 5.

In the fiber-reinforced plastic substrate of Example 11 to 18, the reinforcing fibers of the component [A] were present across the boundary between the resin area (B') and the fiber-reinforced plastic area (E) and the boundary between the resin area (C') and the fiber-reinforced plastic area (E).

Example 19

The fiber-reinforced plastic substrate of Example 11 was cut into a size of 150 mm×150 mm, pressurized at 0.6 MPa by a press molding machine, and heated at 180° C. for 120 minutes, whereby a laminated body in which the thermosetting resin (d) was cured was obtained.

The obtained laminated body was set between molds of an injection molding machine, and the PA-1 as the resin part (F) was injection-molded on a surface of the resin area (B'). Injection molding was performed under the conditions of a cylinder temperature of 260° C. and a mold temperature of 60° C. The injection molding mold had a cavity in which the resin part (F) was molded in the shape of FIGS. 10 and 11, and the resin part (F) had a cross rib shape in which ribs having a width of 15 mm and a height of 5 mm were arranged at intervals of 40 mm and orthogonal to each other. The joining area between the resin area (B') and the resin part (F) was 36% when the surface area of the resin area (B') exposed to the front at the time of the laminated body was 100%. In Table 6, this shape is abbreviated as Type-I. The constitution and moldability evaluation results of the obtained integrated molded article are shown in Table 6.

Next, an integrated molded article of the obtained laminated body and the resin part (F) was set between injection molding molds, and the PP-1 as the resin part (G) was injection-molded on the surface of the resin area (C'). Injection molding was performed under the conditions of a cylinder temperature of 230° C. and a mold temperature of 60° C. The injection molding mold had a cavity in which the resin part (G) was molded in the shape of FIGS. 14 and 15, and the resin part (G) had a rib shape in which ribs having a width of 15 mm and a height of 5 mm were arranged in parallel at intervals of 40 mm. The joining area between the resin area (C') and the resin part (G) was 20% when the surface area of the resin area (C') exposed to the surface in the laminated body was 100%. In Table 6, this shape is abbreviated as Type-II. The constitution and moldability evaluation results of the obtained integrated molded article are shown in Table 6.

Example 20

An integrated molded article was obtained in the same manner as in Example 19 except that the fiber-reinforced plastic substrate was changed from Example 11 to Example 12. The characteristics of the obtained integrated molded article are shown in Table 6.

Example 21

An integrated molded article was obtained in the same manner as in Example 19 except that the fiber-reinforced plastic substrate was changed from Example 11 to Example 13, the resin part (F) was changed from the PA-1 to the PPS-1, and the injection molding conditions of the resin part (F) were changed from a cylinder temperature of 260° C. and a mold temperature of 60° C. to a cylinder temperature of 320° C. and a mold temperature of 150° C. The characteristics of the obtained integrated molded article are shown in Table 6.

Example 22

An integrated molded article was obtained in the same manner as in Example 19 except that the fiber-reinforced plastic substrate was changed from Example 11 to Example 14, the resin part (G) was changed from the PP-1 to the PES-1, and the injection molding conditions of the resin part (G) were changed from a cylinder temperature of 230° C. and a mold temperature of 60° C. to a cylinder temperature of 260° C. and a mold temperature of 60° C. The characteristics of the obtained integrated molded article are shown in Table 6.

Example 23

An integrated molded article was obtained in the same manner as in Example 22 except that the fiber-reinforced plastic substrate was changed from Example 14 to Example 15, the resin part (F) was changed from the PA-1 to the PPS-1, and the injection molding conditions of the resin part (F) were changed from a cylinder temperature of 260° C. and a mold temperature of 60° C. to a cylinder temperature of 320° C. and a mold temperature of 150° C. The characteristics of the obtained integrated molded article are shown in Table 6.

Example 24

An integrated molded article was obtained in the same manner as in Example 22 except that the fiber-reinforced plastic substrate was changed from Example 14 to Example 16, the resin part (F) was changed from the PA-1 to the PEKK-1, and the injection molding conditions of the resin part (F) were changed from a cylinder temperature of 260° C. and a mold temperature of 60° C. to a cylinder temperature of 350° C. and a mold temperature of 150° C. The characteristics of the obtained integrated molded article are shown in Table 6.

Comparative Example 16

An integrated molded article was obtained in the same manner as in Example 19 except that the fiber-reinforced plastic substrate was changed from Example 11 to Comparative Example 11, the resin part (G) was changed from the PP-1 to the PA-1, and the injection molding conditions of the resin part (G) were changed from a cylinder temperature of 230° C. and a mold temperature of 60° C. to a cylinder temperature of 260° C. and a mold temperature of 60° C. The characteristics of the obtained integrated molded article are shown in Table 6.

Comparative Example 17

An integrated molded article was obtained in the same manner as in Comparative Example 16 except that the fiber-reinforced plastic substrate was changed from Comparative Example 11 to Comparative Example 12. The characteristics of the obtained integrated molded article are shown in Table 6.

Comparative Example 18

An integrated molded article was obtained in the same manner as in Comparative Example 16 except that the fiber-reinforced plastic substrate was changed from Comparative Example 11 to Comparative Example 13. The characteristics of the obtained integrated molded article are shown in Table 7.

Comparative Example 19

An integrated molded article was obtained in the same manner as in Example 23 except that the fiber-reinforced plastic substrate was changed from Example 15 to Comparative Example 14, the resin part (G) was changed from the PES-1 to the PPS-1, and the injection molding conditions of the resin part (G) were changed from a cylinder temperature of 260° C. and a mold temperature of 60° C. to a cylinder temperature of 320° C. and a mold temperature of 150° C. The characteristics of the obtained integrated molded article are shown in Table 7.

Comparative Example 20

An integrated molded article was obtained in the same manner as in Example 24 except that the fiber-reinforced plastic substrate was changed from Example 16 to Comparative Example 15, the resin part (G) was changed from the PES-1 to the PEKK-1, and the injection molding conditions of the resin part (G) were changed from a cylinder temperature of 260° C. and a mold temperature of 60° C. to a cylinder temperature of 350° C. and a mold temperature of 150° C. The characteristics of the obtained integrated molded article are shown in Table 7.

Example 25

An integrated molded article was obtained in the same manner as in Example 19 except that the fiber-reinforced plastic substrate was changed from Example 11 to Example 17. The characteristics of the obtained integrated molded article are shown in Table 7.

Example 26

An integrated molded article was obtained in the same manner as in Example 19 except that the fiber-reinforced plastic substrate was changed from Example 11 to Example 18. The characteristics of the obtained integrated molded article are shown in Table 7.

Comparative Example 21

An integrated molded article was obtained in the same manner as in Example 19 except that the fiber-reinforced plastic substrate was changed from Example 11 to Comparative Example 11, the resin part (F) was changed from the PA-1 to the PP-1, and the injection molding conditions of the resin part (F) were changed from a cylinder temperature of 260° C. and a mold temperature of 60° C. to a cylinder temperature of 230° C. and a mold temperature of 60° C. The characteristics of the obtained integrated molded article are shown in Table 7.

Comparative Example 22

An integrated molded article was obtained in the same manner as in Comparative Example 21 except that the fiber-reinforced plastic substrate was changed from Comparative Example 11 to Comparative Example 14. The characteristics of the obtained integrated molded article are shown in Table 7.

Comparative Example 23

An integrated molded article was obtained in the same manner as in Comparative Example 21 except that the fiber-reinforced plastic substrate was changed from Comparative Example 11 to Comparative Example 15. The characteristics of the obtained integrated molded article are shown in Table 7.

Comparative Example 24

Using a layered fiber-reinforced plastic area (E) obtained in the same manner as in Example 11, only the fiber-reinforced plastic area (E) was heated and pressurized at a temperature of 180° C. for 2 hours to obtain a cured product of the fiber-reinforced plastic area (E). On the cured fiber-reinforced plastic area (E), 50 g/m$^2$ of a sheet-like resin area (B') was disposed, and the welding step was performed at 230° C. and 0.5 MPa for 10 seconds. Subsequently, 50 g/m$^2$ of a sheet-like resin area (C') was disposed on the surface of the fiber-reinforced plastic area (E) on the side opposite to the resin area (B'), and the welding step was performed at 200° C. and 0.5 MPa for 10 seconds. However, because the reinforcing fibers in the fiber-reinforced plastic area (E) were not present across the boundary between the resin area (B') and the resin area (C'), both the resin area (B') and the resin area (C') were easily peeled off from the fiber-reinforced plastic area (E), and an intended substrate was not able to be obtained.

TABLE 4-1

|  |  | Example 11 | Example 12 | Example 13 | Example 14 |
|---|---|---|---|---|---|
| Resin area (B') | Thermoplastic resin (b') | PA6 | PA66 | PPS | PA6 |
| Fiber-reinforced plastic area (E) | Thermosetting resin (d) | D-1 | D-1 | D-1 | D-1 |
|  | Reinforcing fiber | CF-1 | CF-1 | CF-1 | CF-1 |
| Resin area (C') | Thermoplastic resin (c') | PP | PP | PP | PES |
|  | SPb | 24 | 25 | 24 | 24 |
|  | SPc | 16 | 16 | 16 | 27 |
|  | ΔSP | 8 | 9 | 8 | 3 |
|  | Tb' | 225 | 267 | 284 | 225 |
|  | Tc' | 170 | 170 | 170 | 225 |
|  | ΔT' | 55 | 97 | 114 | 0 |
| Reinforcing fiber present across boundary | — | present | present | present | present |
| State and arrangement of resin area | — | layered/adjacent | layered/adjacent | layered/adjacent | layered/adjacent |

TABLE 4-1-continued

|  |  | Example 11 | Example 12 | Example 13 | Example 14 |
|---|---|---|---|---|---|
| RSm of (B')/(D) | μm | 47 | 59 | 57 | 47 |
| Rc of (B')/(D) | μm | 23 | 20 | 19 | 23 |
| RSm of (C')/(D) | μm | 58 | 58 | 58 | 58 |
| Rc of (C')/(D) | μm | 12 | 12 | 12 | 15 |

TABLE 4-2

|  |  | Example 15 | Example 16 | Comparative Example 11 |
|---|---|---|---|---|
| Resin area (B') | Thermoplastic resin (b') | PPS | PEKK | PA6 |
| Fiber-reinforced plastic area (E) | Thermosetting resin (d) | D-1 | D-1 | D-1 |
|  | Reinforcing fiber | CF-1 | CF-1 | CF-1 |
| Resin area (C') | Thermoplastic resin (c') | PES | PES | PA6 |
|  | SPb | 24 | 24 | 24 |
|  | SPc | 27 | 27 | 24 |
|  | ΔSP | 3 | 3 | 0 |
|  | Tb' | 284 | 300 | 225 |
|  | Tc' | 225 | 225 | 225 |
|  | ΔT' | 59 | 75 | 0 |
| Reinforcing fiber present across boundary |  | — | present | present |
| State and arrangement of resin area |  | — | layered/adjacent | layered/single |
| RSm of (B')/(D) | μm |  | 56 | 48 | — |
| Rc of (B')/(D) | μm |  | 18 | 24 | — |
| RSm of (C')/(D) | μm |  | 58 | 58 | — |
| Rc of (C')/(D) | μm |  | 15 | 15 | — |

TABLE 5-1

|  |  | Comparative Example 12 | Comparative Example 13 | Comparative Example 14 | Comparative Example 15 |
|---|---|---|---|---|---|
| Resin area (B') | Thermoplastic resin (b') | PA6 | PA66 | PPS | PEKK |
| Fiber-reinforced plastic area (E) | Thermosetting resin (d) | D-1 | D-1 | D-1 | D-1 |
|  | Reinforcing fiber | CF-1 | CF-1 | CF-1 | CF-1 |
| Resin area (C') | Thermoplastic resin (c') | PA66 | PA66 | PPS | PEKK |
|  | SPb | 24 | 25 | 24 | 24 |
|  | SPc | 25 | 25 | 24 | 24 |
|  | ΔSP | 1 | 0 | 0 | 0 |
|  | Tb' | 225 | 267 | 284 | 300 |
|  | Tc' | 267 | 267 | 284 | 300 |
|  | ΔT' | 42 | 0 | 0 | 0 |
| Reinforcing fiber present across boundary |  | — | present | present | present |
| State and arrangement of resin area |  | — | layered/adjacent | layered/single | layered/single |
| RSm of (B')/(D) | μm | 47 | 59 | — | — |
| Rc of (B')/(D) | μm | 23 | 17 | — | — |
| RSm of (C')/(D) | μm | 59 | 59 | — | — |
| Rc of (C')/(D) | μm | 17 | 17 | — | — |

TABLE 5-2

|  |  | Example 17 | Example 18 | Comparative Example 24 |
|---|---|---|---|---|
| Resin area (B') | Thermoplastic resin (b') | PA6 | PA6 | PA6 |
| Fiber-reinforced plastic area (E) | Thermosetting resin (d) | D-2 | D-1 | D-1 |
|  | Reinforcing fiber | CF-1 | CF-2 | CF-1 |
| Resin area (C') | Thermoplastic resin (c') | PP | PP | PP |
|  | SPb | 24 | 24 | 24 |
|  | SPc | 16 | 16 | 16 |
|  | ΔSP | 8 | 8 | 8 |
|  | Tb' | 225 | 225 | 225 |
|  | Tc' | 170 | 170 | 170 |
|  | ΔT' | 55 | 55 | 55 |
| Reinforcing fiber present across boundary |  | — | present | present | none |
| State and arrangement of resin area |  | — | layered/adjacent | layered/adjacent | layered/adjacent |
| RSm of (B')/(D) | μm | 47 | 45 | — |
| Rc of (B')/(D) | μm | 23 | 22 | — |
| RSm of (C')/(D) | μm | 58 | 57 | — |
| Rc of (C')/(D) | μm | 12 | 12 | — |

TABLE 6-1

|  | Example 19 | Example 20 | Example 21 | Example 22 |
|---|---|---|---|---|
| Fiber-reinforced plastic substrate | Example 11 | Example 12 | Example 13 | Example 14 |
| Resin part (F) | PA-1 | PA-1 | PPS-1 | PA-1 |
| Joining structure | Type-I | Type-I | Type-I | Type-I |
| Moldability | good | good | good | good |
| Resin part (G) | PP-1 | PP-1 | PP-1 | PES-1 |

TABLE 6-1-continued

|  | Example 19 | Example 20 | Example 21 | Example 22 |
|---|---|---|---|---|
| Joining structure | Type-II | Type-II | Type-II | Type-II |
| Moldability | good | good | good | fair |

TABLE 6-2

|  | Example 23 | Example 24 | Comparative Example 16 | Comparative Example 17 |
|---|---|---|---|---|
| Fiber-reinforced plastic substrate | Example 15 | Example 16 | Comparative Example 11 | Comparative Example 12 |
| Resin part (F) | PPS-1 | PEKK-1 | PA-1 | PA-1 |
| Joining structure | Type-I | Type-I | Type-I | Type-I |
| Moldability | good | good | bad-2 | bad-2 |
| Resin part (G) | PES-1 | PES-1 | PA-1 | PA-1 |
| Joining structure | Type-II | Type-II | Type-II | Type-II |
| Moldability | good | good | bad-4 | bad-4 |

TABLE 7-1

|  | Comparative Example 18 | Comparative Example 19 | Comparative Example 20 | Example 25 |
|---|---|---|---|---|
| Fiber-reinforced plastic substrate | Comparative Example 13 | Comparative Example 14 | Comparative Example 15 | Example 17 |
| Resin part (F) | PA-1 | PPS-1 | PEKK-1 | PA-1 |
| Joining structure | Type-I | Type-I | Type-I | Type-I |
| Moldability | bad-2 | bad-2 | bad-2 | good |
| Resin part (G) | PA-1 | PPS-1 | PEKK-1 | PP-1 |
| Joining structure | Type-II | Type-II | Type-II | Type-II |
| Moldability | bad-4 | bad-4 | bad-4 | good |

TABLE 7-2

|  | Example 26 | Comparative Example 21 | Comparative Example 22 | Comparative Example 23 |
|---|---|---|---|---|
| Fiber-reinforced plastic substrate | Example 18 | Comparative Example 11 | Comparative Example 14 | Comparative Example 15 |
| Resin part (F) | PA-1 | PP-1 | PP-1 | PP-1 |
| Joining structure | Type-I | Type-I | Type-I | Type-I |
| Moldability | good | bad-1 | bad-1 | bad-1 |
| Resin part (G) | PP-1 | PP-1 | PP-1 | PP-1 |
| Joining structure | Type-II | Type-II | Type-II | Type-II |
| Moldability | good | bad-3 | bad-3 | bad-3 |

INDUSTRIAL APPLICABILITY

Because the fiber-reinforced plastic substrate according to the present invention is obtained by compounding resins of a combination of different properties, particularly a plurality of thermoplastic resins having low compatibility, it is possible to obtain a substrate having a combination of different properties, which was difficult in conventional techniques. In addition, by applying the fiber-reinforced plastic substrate and the integrated molded article of the present invention to aircraft structural members, wind turbine blades, automobile structural members, and computer applications such as IC trays and housings of notebook computers, it is possible to exhibit excellent performance as a structure and to greatly reduce the molding time and molding cost of products according to the above applications.

DESCRIPTION OF REFERENCE SIGNS

A: Cross section A
B: Cross section B
C: Cross section C
1: Fiber-reinforced plastic substrate
2: Component [A] (reinforcing fibers)
3: Component [B] (thermoplastic resin (b)) and component [C] (thermoplastic resin (c))
4: Fiber direction (reference axis)
5: Observation cross section (cross section obtained by cutting a fiber-reinforced plastic substrate perpendicularly to a plane formed by the fiber-reinforced plastic substrate)
6: Component [B]
7: Component [C]
8: Observation cross section
9: Boundary
10: End portion of component [C] (reference line)
11: Vertical base line
12: Cross-section curve
13: Continuous fiber-reinforced sheet
14: Fiber-reinforced plastic intermediate
15: Drawing step
16: First impregnating step
17: Second impregnating step
18: Take-up step
19: First surface
20: Second surface
21: Metal member
22: Test piece holder
23: PA injection material
24: PP injection material
9-1: Resin area (B')
9-2: Fiber-reinforced plastic area (E)
9-3: Resin area (C')
10-1: Resin area (B')
10-2: Resin part (F)
10-3: Portion corresponding to cross-sectional image of FIG. 11
11-1: Fiber-reinforced plastic substrate
11-2: Resin part (F)
11-3: Resin area (B')
11-4: Fiber-reinforced plastic area (E)
11-5: Resin area (C')
12-1: Part of resin part (F) that has come around resin area (C') side
12-2: Resin area (C')
12-3: Portion corresponding to cross-sectional image of FIG. 13
12-4: Inner cross-sectional portion of resin part (F) joined to resin area (B') viewed from resin area (C') side
13-1: Resin part (F)
13-2: Resin area (B')
13-3: Fiber-reinforced plastic area (E)
13-4: Resin area (C')
14-1: Resin area (C')
14-2: Resin part (G)
14-3: Portion corresponding to cross-sectional image of FIG. 15
15-1: Fiber-reinforced plastic substrate
15-2: Resin part (G)
15-3: Resin area (C')
15-4: Fiber-reinforced plastic area (E)
15-5: Resin area (B')
16-1: Resin area (B')
16-2: Resin part (F)
16-3: Fiber-reinforced plastic area (E)
16-4: Resin area (C')
16-5: Resin part (G)
17-1: Component [A] (reinforcing fibers)

17-2: Resin area (B')
17-3: Fiber-reinforced plastic area (E)
17-4: Observation image of cross section
17-5: Boundary
17-6: End portion (reference line) of fiber-reinforced plastic area (E)
17-7: Vertical base line
17-8: Cross-section curve

The invention claimed is:

1. A fiber-reinforced plastic substrate comprising components [A], [B], and [C] shown below:
[A] reinforcing fibers;
[B] thermoplastic resin (b); and
[C] thermoplastic resin (c),
wherein
the component [A] is arranged in one direction,
in the fiber-reinforced plastic substrate, a resin area including the component [B] and a resin area including the component [C] are present,
the resin area including the component [B] is present on a surface of one side of the fiber-reinforced plastic substrate,
a distance $Ra_{(bc)}$ between Hansen solubility parameters of the component [B] and the component [C] satisfies formula (1):

$$Ra_{(bc)} = \{4(\delta DB - \delta DC)^2 + (\delta PB - \delta PC)^2 + (\delta HB - \delta HC)^2\}^{1/2} \geq 8 \quad \text{Formula (1)}$$

wherein
$Ra_{(bc)}$ is a distance between Hansen solubility parameters of the component [B] and the component [C];
$\delta DB$ is an energy due to intermolecular dispersive power of the component [B];
$\delta DC$ is an energy due to intermolecular dispersive power of the component [C];
$\delta PB$ is an energy due to intermolecular dipole interaction of the component [B];
$\delta PC$ is an energy due to intermolecular dipole interaction of the component [C];
$\delta HB$ is an energy due to intermolecular hydrogen bonding of the component [B]; and
$\delta HC$ is an energy due to intermolecular hydrogen bonding of the component [C], and
the component [A] is present across a boundary between the resin area including the component [B] and the resin area including the component [C] and included in both resin areas.

2. The fiber-reinforced plastic substrate according to claim 1, wherein when a cross section perpendicular to the fiber-reinforced plastic substrate is obtained in a direction of 45 degrees with respect to a fiber direction of the component [A] in a plan view of the fiber-reinforced plastic substrate,
a cross-section curve formed by the boundary between both resin areas in the cross section has a roughness average length RSm defined in JIS B0601 (2001) of 100 μm or less,
and a roughness average height Rc of 3.5 μm or more.

3. The fiber-reinforced plastic substrate according to claim 1, wherein the resin area including the component [B] and the resin area including the component [C] are each formed in a layer and adjacent to each other to form the boundary.

4. The fiber-reinforced plastic substrate according to claim 1, having an impregnation rate of 80% or more.

5. The fiber-reinforced plastic substrate according to claim 1, satisfying formula (2):

$$50 \leq \Delta T \leq 200 \quad \text{Formula (2)}$$

wherein
ΔT is an absolute value of difference between Tb and Tc;
Tb is a melting point of the thermoplastic resin (b) when the thermoplastic resin (b) is a crystalline resin, and a glass transition temperature [° C.] of the thermoplastic resin (b) when the thermoplastic resin (b) is an amorphous resin; and
Tc is a melting point of the thermoplastic resin (c) when the thermoplastic resin (c) is a crystalline resin, and a glass transition temperature [° C.] of the thermoplastic resin (c) when the thermoplastic resin (c) is an amorphous resin.

6. The fiber-reinforced plastic substrate according to claim 5, wherein at least one of Tb and Tc is 250° C. or less.

7. An integrated molded article obtained by joining another member to the fiber-reinforced plastic substrate according to claim 1.

8. The integrated molded article according to claim 7, wherein the another member is joined to the fiber-reinforced plastic substrate via the component [B] and/or the component [C].

9. A fiber-reinforced plastic substrate comprising components [A], [B'], [C'], and [D] shown below:
[A] reinforcing fibers;
[B'] thermoplastic resin (b');
[C'] thermoplastic resin (c'); and
[D] thermosetting resin (d),
wherein
a resin area (B') including the component [B'], a fiber-reinforced plastic area (E) including the component [D] and the component [A], and a resin area (C') including the component [C'] are adjacent in this order to form boundaries, and
the component [B'] and the component [C'] satisfy formula (3):

$$2 < \Delta SP \leq 10 \quad \text{Formula (3)}$$

wherein
ΔSP is an absolute value of difference between SPa and SPC;
SPa is an SP value of the component [B'] [(MPa)$^{1/2}$]; and
SPc is an SP value of the component [C'] [(MPa)$^{1/2}$].

10. The fiber-reinforced plastic substrate according to claim 9, wherein the resin area (B') including the component [B'], the resin area (C') including the component [C'], and a fiber-reinforced plastic area (E) including the component [D] and the component [A] are each formed in a layer and adjacent to each other to form the boundaries.

11. The fiber-reinforced plastic substrate according to claim 9, wherein the component [B'] and the component [C'] are each at least one thermoplastic resin selected from the group consisting of polyolefin, polycarbonate, polyester, polyarylene sulfide, polyamide, polyoxymethylene, polyetherimide, polyethersulfone, and polyarylene ether ketone.

12. The fiber-reinforced plastic substrate according to claim 9, wherein the component [B'] and the component [C'] are any combination selected from the combination in which the component [B'] is polyamide and the component [C'] is polyolefin, the combination in which the component [B'] is polyarylene sulfide and the component [C'] is polyolefin, the combination in which the component [B'] is polyamide and the component [C'] is polyethersulfone, the combination in which the component [B'] is polyarylene sulfide and the component [C'] is polyethersulfone, and the combination in which the component [B'] is polyarylene ether ketone and the component [C'] is polyethersulfone.

13. The fiber-reinforced plastic substrate according to claim 9, wherein at least a part of the reinforcing fibers of the component [A] is present across the boundary between the resin area (B') and the fiber-reinforced plastic area (E) and/or the boundary between the resin area (C') and the fiber-reinforced plastic area (E).

14. The fiber-reinforced plastic substrate according to claim 9, wherein when a cross section perpendicular to the fiber-reinforced plastic substrate is obtained in a direction of 45 degrees with respect to a fiber direction of the component [A] in a plan view of the fiber-reinforced plastic substrate,
a cross-section curve formed by the boundary between the resin area (B') and the fiber-reinforced plastic area (E) and/or the boundary between the resin area (C') and the fiber-reinforced plastic area (E) in the cross section has a roughness average length RSm defined in JIS B0601 (2001) of 100 μm or less, and a roughness average height Rc of 3.5 μm or more.

15. The fiber-reinforced plastic substrate according to claim 9, satisfying formula (4):

$$50 \leq \Delta T' \leq 150 \quad \text{Formula (4)}$$

wherein
ΔT' is an absolute value of difference between Tb' and Tc';
Tb' is a melting point of the thermoplastic resin (b') when the thermoplastic resin (b') is a crystalline resin, and a glass transition temperature [° C.] of the thermoplastic resin (b') when the thermoplastic resin (b') is an amorphous resin; and
Tc' is a melting point of the thermoplastic resin (c') when the thermoplastic resin (c') is a crystalline resin, and a glass transition temperature [° C.] of the thermoplastic resin (c') when the thermoplastic resin (c') is an amorphous resin.

16. The fiber-reinforced plastic substrate according to claim 9, wherein in the fiber-reinforced plastic area (E), the component [A] has:
a form in which the reinforcing fibers are arranged in one direction;
a form of a layered product obtained by laminating a plurality of layers of the reinforcing fibers in which the reinforcing fibers are arranged in one direction; or
a form of a woven fabric.

17. The fiber-reinforced plastic substrate according to claim 9, wherein the component [D] is present as a cured product.

18. An integrated molded article in which a resin part (F) is integrated with the fiber-reinforced plastic substrate according to claim 17 by being joined to a surface of the resin area (B') and/or a resin part (G) is integrated with the fiber-reinforced plastic substrate according to claim 17 by being joined to a surface of the resin area (C'),
wherein a proportion of a joining area between the resin area (B') and the resin part (F) is in a range of 5% or more and less than 50% when a surface area of the resin area (B') is 100%, and/or a proportion of a joining area between the resin area (C') and the resin part (G) is in a range of 5% or more and less than 50% when a surface area of the resin area (C') is 100%.

19. A method for producing a fiber-reinforced plastic substrate including components [A], [B], and [C] shown below:
[A] reinforcing fibers;
[B] thermoplastic resin (b); and
[C] thermoplastic resin (c),
wherein
at least a drawing step, a first impregnating step, and a second impregnating step shown below are carried out continuously in this order while causing the component [A] to travel:
<drawing step> a step of obtaining a continuous reinforcing fiber sheet in which the component [A] is arranged in one direction by aligning the continuous component [A], and then supplying the obtained continuous reinforcing fiber sheet including the component [A] in a fiber direction toward a subsequent step;
<first impregnating step> a step of impregnating the component [B] from one surface of the continuous reinforcing fiber sheet to obtain a fiber-reinforced plastic intermediate in which the component [B] is present on a first surface of the continuous reinforcing fiber sheet;
<second impregnating step> a step of impregnating component [C] from a second surface opposite to the first surface to obtain a fiber-reinforced plastic substrate, and
a distance Ra$_{(bc)}$ between Hansen solubility parameters of the component [B] and the component [C] satisfies formula (5):

$$Ra_{(bc)} = \{4(\delta DB - \delta DC)^2 + (\delta PB - \delta PC)^2 + (\delta HB - \delta HC)^2\}^{1/2} \geq 8 \quad \text{Formula (5)}$$

wherein
Ra$_{(bc)}$ is a distance between Hansen solubility parameters of the component [B] and the component [C];
δDB is an energy due to intermolecular dispersive power of the component [B];
δDC is an energy due to intermolecular dispersive power of the component [C];
δPB is an energy due to intermolecular dipole interaction of the component [B];
δPC is an energy due to intermolecular dipole interaction of the component [C];
δHB is an energy due to intermolecular hydrogen bonding of the component [B]; and
δHC is an energy due to intermolecular hydrogen bonding of the component [C].

20. The method for producing a fiber-reinforced plastic substrate according to claim 19, wherein in the obtained fiber-reinforced plastic substrate,
a resin area including the component [B] and a resin area including the component [C] are present,
the component [A] is present across a boundary between the resin area including the component [B] and the resin area including the component [C] and included in both resin areas, and
when a cross section perpendicular to the fiber-reinforced plastic substrate is obtained in a direction of 45 degrees with respect to a fiber direction of the component [A] in a plan view of the fiber-reinforced plastic substrate,
a cross-section curve formed by the boundary between both resin areas in the cross section has a roughness average length RSm defined in JIS B0601 (2001) of 100 μm or less,
and a roughness average height Rc of 3.5 μm or more.

21. The method for producing a fiber-reinforced plastic substrate according to claim 20, wherein the resin area including the component [B] and the resin area including the component [C] are each formed in a layer and adjacent to each other to form the boundary.

* * * * *